(12) United States Patent
Coleman

(10) Patent No.: US 11,968,112 B1
(45) Date of Patent: Apr. 23, 2024

(54) SYSTEM FOR NON-CENTRIC STATELESS ROUTING VIA AUTOMATICALLY SELECTED BEST QUALITY LINK

(71) Applicant: Pulse IQ LLC, Berlin, MD (US)

(72) Inventor: Scott Coleman, Berlin, MD (US)

(73) Assignee: Pulse IQ, LLC, Berlin, MD (US)

( * ) Notice: Subject to any disclaimer, the term of this patent is extended or adjusted under 35 U.S.C. 154(b) by 0 days.

(21) Appl. No.: 18/066,557

(22) Filed: Dec. 15, 2022

(51) Int. Cl.
*H04W 40/02* (2009.01)
*H04L 45/00* (2022.01)
*H04L 45/02* (2022.01)
*H04L 45/12* (2022.01)

(52) U.S. Cl.
CPC ............ *H04L 45/123* (2013.01); *H04L 45/02* (2013.01); *H04L 45/20* (2013.01)

(58) Field of Classification Search
CPC ........ H04L 45/123; H04L 45/02; H04L 45/20
See application file for complete search history.

(56) References Cited

U.S. PATENT DOCUMENTS

| | | | | |
|---|---|---|---|---|
| 8,665,841 B1* | 3/2014 | Goel | ...................... | H04L 45/26 370/327 |
| 2010/0290441 A1* | 11/2010 | Stewart | .................. | H04W 40/12 370/338 |
| 2014/0108643 A1* | 4/2014 | Hui | ......................... | H04L 45/48 709/224 |

\* cited by examiner

*Primary Examiner* — Kim T Nguyen
(74) *Attorney, Agent, or Firm* — WCF IP

(57) ABSTRACT

Examples include a coordinator device broadcasting a route request identifying a destination device, to neighbor routers over reception paths. The neighbor routers then store a respective route record, indicating each as an end node in an in-progress path from the coordinator device to the destination device, and rebroadcast the route request for reception by next increment router neighbors. The next increment router neighbors, responsive to receiving the rebroadcasts, estimate a quality between good hop and bad hop of their reception paths, and determine, as an evaluation total path quality, a quality of a candidate hop path from the coordinator device to the next increment router neighbor. The next increment router neighbors determine if they have extant hop connection to the coordinator device with path quality at least as good as the evaluation total path quality. If "no,", the next increment router neighbor increments the hop sequence by one hop.

7 Claims, 17 Drawing Sheets

| 1502-1 | 1502-2 | 1502-3 | 1502-4 | 1502-5 | 1502-6 |
|---|---|---|---|---|---|
| CRD-ID | DST-ID | SND-ID | NXT-ID | TPQ (THP, BHP) | Complete? Yes / No |
Fig. 15
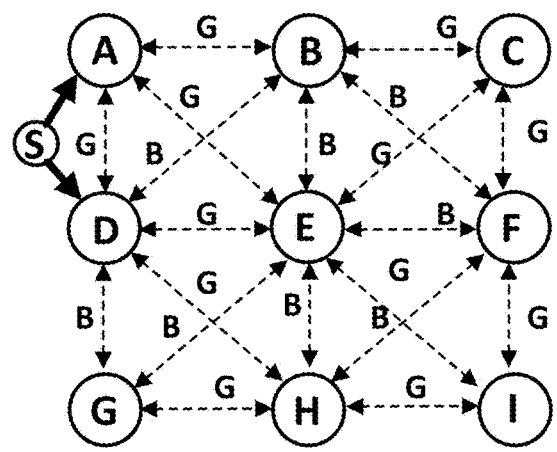
Fig. 16A
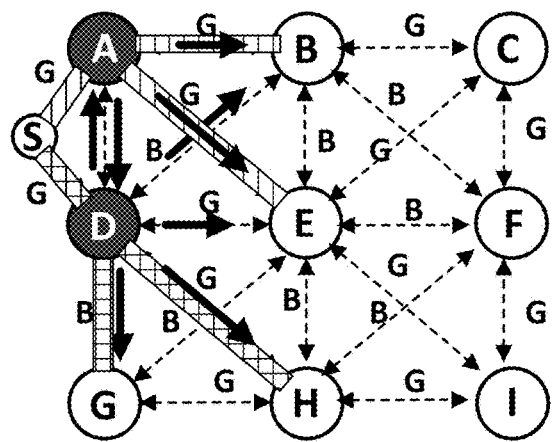
Fig. 16B

SYSTEM FOR NON-CENTRIC STATELESS ROUTING VIA AUTOMATICALLY SELECTED BEST QUALITY LINK

TECHNICAL FIELD

This invention generally relates to data interconnects, and more particularly to reduced overhead routing with distributed, non-centric automatic quality selective link construction.

BACKGROUND

Various systems can include a distribution of sensor devices, e.g., movement detectors, thermostats, and the like, and actuators such as light switches and door locks, to collectively provide sensing and controlling of conditions within a limited physical area, e.g., hotel room. Such systems can include a local controller connected, e.g., via a data interconnect, to the local arrangement of sensors and actuators. The local controllers may connect via a larger capacity network, e.g., Ethernet or WiFi, to a higher level controller.

Zigbee is a known technique of local data interconnect for such applications. A significant reason is that Zigbee communications have low power consumption. This has substantial benefit in many Zigbee's applications because the devices in such applications are typically battery powered.

However, Zigbee has shortcomings. For example in many applications and environments in which Zigbee is used, the effective maximum number of nodes may be limited, for example, to approximately 5-20 nodes. There are costs, e.g., in system speed and reliability, of supporting networks with 10s or 100s of routing devices and therefor such numbers are not typical or practical on a Zigbee network.

SUMMARY

Systems according to one or more embodiments can include a spatially distributed mesh array of wireless router nodes and can further include, located among and/or adjacent the mesh array, one or more wireless coordinator nodes. Hardware configuration of embodiments' wireless routers nodes can, but does not necessarily, include apparent functional similarities to certain features of a Zigbee wireless router. However, as will be understood and appreciated by persons of ordinary skill in the pertinent arts upon reading this entire disclosure, various significant and material differences of wireless routers configured according to one or more embodiments, compared to routers of a Zigbee or similar short range local data interconnect, are those obtainable through embodiment features. These include, without limitation, significantly lower computational burden, lower storage requirement, and reduced communication overhead. Secondary benefits and advantages provided by these can include, but are not limited to, reduced complexity processing hardware, and corresponding reduction of processing hardware footprint and power consumption.

According to one or more embodiments, a system can include a mesh network of router devices (RTDs), one or more coordinator devices (CRDs), and a distribution of end devices. References herein to end devices generally use the term "destination device(s)" as the context of such description often pertains to specific, e.g., selected ones of the end devices. According to various embodiments, functionalities of the CRDs can include, in addition to receiving and processing data, e.g., temperature measurements, from the end devices, generating and wireless broadcasting of route requests (RQS), and maintaining and updating a record of the broadcast RQSs. Each RQS can include identification, e.g., a destination device identifier (DST-ID), of a specific end device to which the CRDs needs the RTDs to construct a dedicated multi-hop link.

Functionalities of the RTDs providing for such constructing can include receiving the RQSs and conditionally rebroadcasting (RBS) the RQSs and can include receiving and conditionally rebroadcasting the RBSs. The conditional RBS can include a first or initial group of the RTDs, which in response to direct reception of the CRD broadcast of the RQS, estimating, e.g., by detecting a received signal strength indication (RSSI) or bit error rate (BER), or both, the quality of the reception path over which it received the original RQS. The first increment RTDs can then include the estimate, e.g., as a total path quality (TPQ) value, in the first increment RBS.

According to one or more embodiments, the RQS can include an identifier, e.g., CRD-ID of the CRD. This feature can enable practices in which the mesh network can include a plurality of CRDs. In such embodiments, the RTDs can be correspondingly configured to serve, concurrently, as a hop node of an established, or in-progress path from a first CRD to a particular destination (DST) device, and as a hop node for an established, or in-progress path from a second CRD to the same or another DST device.

In one or more embodiments, a first increment RBS trigger condition can be the first increment RBS sending router receiving the CRD's original RQS broadcast. Trigger for subsequent increments can include reception of the RBS, estimating a quality of the wireless propagation path over which the RBS is received, In practices according to various embodiments, a time-lapse representative animation. e.g., using highlighted representations of router nodes active in the increments can appear as a generally outward progressing group or "wavefront" of the routers.

Related to the conditional RBS feature, functionalities of the RTDs can include estimating a quality, i.e., a cost, of the reception path over which the RTD receives the RQS. According to various embodiments, the estimating can include classifying the reception path between "good" and "bad," and such classifying can be based for example on the received signal's bit error rate (BER), or the received signal strength indicator (RSSI), or both. According to one or more embodiments, the estimating can generate the quality measurement, i.e., cost of the reception path, as a pair of values, e.g., a hop increment value and a quality increment value.

In an embodiment, the hop increment value can always be integer one, regardless of the quality of the path. In one or more embodiments, the quality increment can be arithmetic zero when the reception path is classified as good, and a scalar amount when the reception path is classified as bad. The scalar amount can be but is not limited to integer one. Features of generating the quality estimation as a hop increment value and a quality increment value include but are not limited to an ability to perform, corresponding to a series concatenating of hop paths, a series summation of their respective hop increment values and quality increment values. The series summing operations have low computation cost, and the resulting series summation is a usable estimate of a quality of the path provided by the concatenating.

According to various embodiments, RTDs that receive the direct CRD broadcast of the RQS can estimate the quality of the reception path between good and bad and can include in the route record for the reception, with the DST-ID, a hop value of integer 1 and a quality value either of integer 1 or zero. In one or more embodiments, these RTDs can include in their respective RBSs of the RQS the numeric pair comprising the hop value and the quality values. According to various embodiments, the RBS can be referenced as a first increment RBS, and their broadcast RBSs as "first increment RBSs." Assuming the RTDs are arranged such that each has at least one other RTD that is a neighbor, each of the first increment RBSs will reach a respective second increment group of the RTDs. For purposes of description, referencing as "subject second increment RTDs" only members of the second increment group without any current route record for DST-ID, each subject second increment RTD can estimate the quality of its respective reception path and generate a respective second increment pair of values, e.g., a second increment hop count and a second increment bad hop count. According to various embodiments, each subject second increment RTDs can also extract the first increment hop value and the first increment bad hop value from the received first increment RBS.

According to various embodiments, the subject second increment RTDs can then sum the extracted first increment hop value and first increment bad hop value with their respective second increment hop count and second increment bad hop count to obtain what will be referenced as a "candidate total path quality," or "candidate TPQ value."

According to various embodiments, AODV routing does not require its router nodes to store state information regarding available neighbors. On the contrary, according to various embodiments, each of the integer M router nodes of a constructed M-hop link need store only two node identifiers, namely, the node immediately preceding the router, and the node immediately succeeding the router. These provide, among other features, an ability of each router to talk to any number of neighbors without consuming any additional CPU resources. There can be <n> nodes and <r> routes. <n> is a very large number, <r> is an implementation dependent number, let's say r=10. Even though n is large, there can only be 10 active routes in the system at once. Another view is the route table is a cache of the last <r> routes.

Additionally, according to various embodiments routing knowledge can be contained in, and therefore carried by the routing request messages passed between the nodes. The routing knowledge can include a route "distance" or "cost" calculation based on total number of hops and number of "bad" hops that do not meet a minimum RSSI link quality. Routing is computationally very inexpensive.

This Summary identifies example features and aspects and is not an exclusive or exhaustive description of disclosed subject matter. Whether features or aspects are included in or omitted from this Summary is not intended as indicative of relative importance of such features or aspects. Additional features are described, explicitly and implicitly, as will be understood by persons of skill in the pertinent arts upon reading the following detailed description and viewing the drawings, which form a part thereof.

BRIEF DESCRIPTION OF THE DRAWINGS

FIG. 2B graphically shows an example RQS rebroadcasting (RBS) by RTD B reaching, by respective reception paths, RTD C, DST D, and RTD E, and shows corresponding instantiation of route entries in DST D and in RTD E;

FIG. 2C graphically shows RTD E rebroadcasting to DST D and to RTD E the RQS that RTD E received via the RBS from RTD B, and shows DST D updating its route table to identify RTD E as the end node of its current best quality feed sequence;

FIG. 2D graphically shows DST D transmitting an addressed route response to RTD E and shows RTD E, in response, fixing its DST route record as "complete" by identifying both the node preceding RTD E and the node succeeding RTD E;

FIG. 2E graphically shows RTD E transmitting an addressed route response to RTD B and shows RTD B, in response, fixing its DTS route record as "complete" by identifying both the node preceding RTD B (CRD A) and succeeding RTD B (RTD E);

FIG. 2F graphically shows RTD B transmitting an addressed route response to CRD A and shows CRD A, in response, fixing its DTS route record as "complete" by identifying the node succeeding CRD A (RTD B); and FIG. 2G graphically shows RDT C having erased the device's never completed DST D route.

FIG. 15 shows one example logical arrangement of a route table entry.

FIGS. 16A-16H show, using an arbitrarily selected example reception path condition of an abstracted cartesian distributed mesh network of router devices that can function as destination devices, a distributed automatic constructing of a stateless routing engine best quality link according to various embodiments.

DETAILED DESCRIPTION

Figure 1:
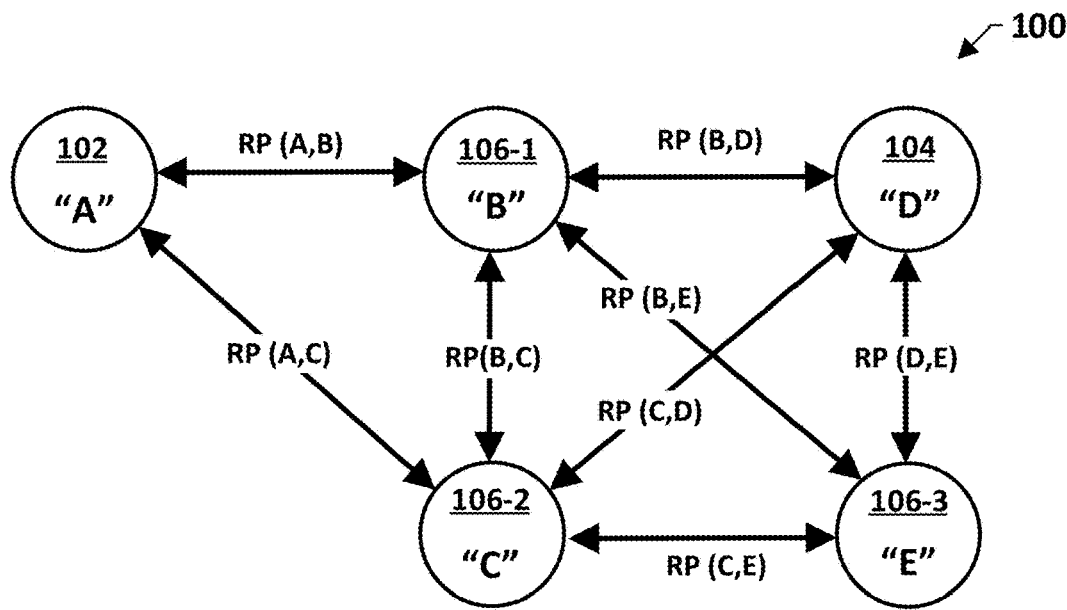
FIG. 1 shows one example topography of one mesh network on which systems and methods according to various embodiments can be practiced.

General description of various embodiments various features and aspects thereof can be assisted by certain references to the Zigbee protocol. An example mesh network can comprise router devices, end devices, and coordinator devices. According to Zigbee protocol, each stack maintains state information about each of its neighbors. This includes addressing scheme, identification data (IDs), security information and link quality statistics. The state information is generally held in random access memory (RAM) and in flash memory, to persist across power cycles. The neighbor table that is stored in Zigbee routers according to Zigbee standards and practices can be instrumental in Zigbee routing and network operations. In a range of applications, however, Zigbee runs on resource restricted central processing units (CPU) such as the Texas Instruments™ model TI CC2531. This can significantly limit the maximum number of fully supported neighbors.

According to various embodiments, PIQ-Z comprises a plurality of features and combinations of features that in turn provide a plurality of direct, secondary, and tertiary advantages. Technical advantages include but are not limited to reduction of congestion; increase in network size. Further technical features include, but are not limited to Very Low Memory Requirements for Routing—Each route through the network only requires about 16 bytes of memory from each node regardless of network size.

No persistent memory is needed for network routines. On the contrary, all routes can be created as needed in random access memory (RAM).

Bad Hop/Good Hop Distance Vector strategy—Best routes are determined by the number of good and bad hops in the path.

Coordinator Centric Mesh Application—According to various embodiments, only the coordinator device can create routes. The total number of routes in such systems can be controlled by the coordinator. The implementation allocates 8 total routes per node.

Staggered Data Reporting Strategy-Orderly reporting to reduce traffic.

Technical Features can Also Include

In one or more embodiments, the application layer can initiate all route requests.

The Route Record allocation procedure first looks for unused records.

According to various embodiments, if all records are used, one strategy can be re-use of the oldest route record.

Intermediate nodes can react whenever they receive a Route Request or Route Response.

When a Route Request is received, the node can compare the receive RSSI to a fixed threshold to determine if the last hop was a "good" or "bad" hop. The node can then increment the "hops" value or the "badHops" value in the request accordingly.

New Route Requests can be compared to that last best Route Request. The new request can be considered better if it has fewer bad hops or the bad hops are equal and has fewer good hops.

Stateless Routing

PIQ-Z can use certain portions of the AODV routing strategy used by Zigbee and other mesh networks, but provide multiple substantive differences, and combinations of differences over Zigbee and other conventional protocol, limited to, technical solutions to Zigbee shortcomings identified above, and other benefits and advantages. Among the substantial differences Zigbee possesses is providing AODV without requiring router nodes to save state information regarding their available neighbors. According to various embodiments PIQ-Z does not require its routers maintain neighbor table. This feature provides benefits including, but not limited to, enabling each router to talk to a large number of neighbors without consuming additional amounts of its processing resources.

Best Path

According to various embodiments Route Request (RQS) message can contain the number of "good" hops and "bad" hops the RQS encountered since it left the requesting node. A good vs bad hop can be determined, for example, by computing or extracting the RSSI & error rate of the message at the receiver, and comparing the computed results against a threshold to determine good vs bad.

According to various embodiments an RQS can be selected based first on choosing the least number of bad hops. In one or more embodiments, if the number of bad hops are equal, the choosing can be based on the least number of good hops. If good hops are equal, then choosing the best local RSSI.

Routing Knowledge is Communicated by RQS Messages Passed Between the Nodes.

This feature distributes computational burden and enables later increment re-broadcasts to be determined based on a carried forward accumulated knowledge of the hop sequences, which can be computationally very inexpensive.

Coordinator Centric Application, without Burdening the Coordinator

PIQ-Z enables taking advantage of the fact that, for various applications, such as thermostats (e.g., "TSTats") there may be little or no requirement for communications between the TSTats. On the contrary, in various of such applications a substantial portion of the data flows can be from the TSTats to the coordinator device or from the coordinator device to the TSTats.

As will understood and appreciated by persons of ordinary skill upon reading this disclosure, systems and methods using one or more embodiments of PIQ-Z can assist in optimizing, in terms of time and efficiency, the implementation of the mesh network for this type of application.

The coordinator device controls when it needs all devices to report data or when it needs to establish a reliable link to a single device for operations such as firmware updates.

Staggered Reporting

Another substantial technical feature of PIQ-Z is utilization of a temporal distance between the nodes to avoid on air contention and congestion. In an example configuration, the coordinator device can assign sequential network addresses to end devices, e.g., as the end devices are admitted to the network. The coordinator device can subsequently broadcast a request for data across the network and the nodes will respond in sequence based on network address without negotiating airtime. This makes for very orderly and reliable communications.

According to various embodiments staggered reporting can leverage a Many-To-One routing in a manner enabling all nodes to know how to forward a message to the coordinator device. Features of such embodiments can include, for example, low cost continuous maintaining of a network wide Many-To-One route.

FIG. 1 shows a diagram an example topography 100 (hereinafter "system 100") of one configuration of a mesh network on which systems and methods according to various embodiments can be practiced. System 100 includes one example coordinator device ("CRD") 102, an example population of integer 3 different router devices (RTDs), numbered 104-1, 104-2, and 104-3 (collectively "RTDs 104), and an example end device 106. For convenience in referencing FIG. 1 in subsequent paragraph description of example operations, references to the CRD 102 will alternatively use "CRD A," in accordance with the FIG. 1 visible "A" label, and references to RTDs 104 will alternatively use "RTD-B," "RTD-C, and "RTD-E" in accordance with the visible "B," "C," and "E" labels. The end device 106, labeled "D" in the figure, is assigned as the destination device in following description of RTDs constructing 1:1 links in accordance with various embodiments, and is therefore alternatively referenced as "destination device D" and "DST D." It will be understood that DST D can be a low-complexity non-router implementation of the end device 106 and, according to one or more embodiments, can be one of the RTDs 104 configured, e.g., by processor executable instructions stored in the device's non-transitory storage resources, as an end device.

According to various embodiments the CRD 102 can comprise logic for initiating a distributed, automatic constructing of a 1:1 multi-hop link between the CRD A and DST D that provides the highest total quality, i.e., the highest end-to-end cumulative quality path available under current propagation path conditions. The CRD 102 logic for initiating the constructing of the 1:1 muti-hop link can be configured to generate and broadcast, for reception by RTDs 104 that neighbor the CRD, a route request (RQS). The RQS can carry identification of the destination device, e.g., DST D. In one or more embodiments the CRD 102 logic can be configured to include in the RQS an identification (CRD-ID) of the specific coordinator device. Configuring the CRD 102 logic to include the CRD-ID in the RQS can enable the RTDs 104 to receive RQSs from multiple CRD, e.g., a first RQS originated by a first CRD and a second RQS originated by a second CRD, and proceed to construct and store a highest available quality 1:1 links for both. The CRD 102 logic can be configured to instantiate in its memory, in association with the RQS, an in-progress route entry. The in-progress route entry can include identity data (DST-ID) for the destination device (e.g., DST D) and can include a flag indicating whether route is in-progress or successfully established, e.g., over overlapping or partially overlapping time intervals, or over non-overlapping time intervals, According to one or more embodiments, RTDs 104 can comprise a RQS reception and conditional re-broadcasting (RCBR) logic, and an RTD route record memory. The RQS RCBR logic can include a reception path quality estimator configured to estimate, in response to receiving the RQS from the CRD 102 or receiving a subsequent re-broadcasting (RBS) of the RQS from another RTD 104, a quality of the reception path, between being a good hop and a bad hop. In 1:1 route constructing processes according to various embodiments, in response to receiving a direct RQS from the CRD 102 the RTD 104 RCBR logic can indicate the receiving RTD 104 is now a first hop node of an in-progress hop path to the DST device 106. In one or more embodiments, such indication can comprise instantiating a DST-ID route record in the receiving RTD 104 memory. The DST-ID route record can include the DST-ID, identification of the RQS sender device, and a total cost or quality measurement of the reception path. According to various embodiments the total cost or quality measurement can comprise a pair of scalar values, one being an increment of one hop, and the other being a bad hop increment. According to one or more embodiments, the bad hop increment can be integer 1 or zero, depending on the estimated quality of the path.

In one or more embodiments the receiving RTD 104 RCBR logic can be further configured to cause, in association with storing indication of now being a present end node of an in-progress hop path to the DST device 106, the RTD 104's wireless transmission resources to re-broadcast (RBS) the RQS. The RTD 104 RCBR logic, in one or more embodiments, can include in the RBS the estimated quality of the reception path and a sender identification (SND-ID) of the receiving RTD 104 as the RBS sender. The RBS can be configured, e.g., by signal power and antenna characteristics, to be received by the RBS sender's immediate neighbors.

The RTD 104 RCBR logic can be configured such that instances of the logic in neighbors of the above-identified RBS sender, and in neighbors of later increment RBS senders, can select in response to receiving the RBS or later increment RBS whether to become a next node for the in-progress hop path of which the sender RTD 104 is presently an end node. According to one or embodiments, such selecting can comprise the neighbor estimating, as an evaluation value, a total quality or cost of a candidate hop path comprising the in-progress hop path of which the sender RTD 104 is presently an end node, appended by the hop path from the sender RTD 104 to the present neighbor RTD 104. According to various embodiments, instances of the RTD 104 RCBR logic in neighbors of the RBS sender or of a later increment RBS sender, can perform the selecting using a stepped selection process. In one or more embodiments, the first step can comprise determining whether neighbor whether currently stores any DTS-ID route record. If the answer is no, appending the neighbor as a next node for the in-progress hop path of which the sender RTD 104 is presently an end node will provide a necessarily better in-progress CRD 102 to DST 106 hop path than currently provided.

Example 1—Initiating and Distributed Automatic Router Constructing of a 1:1 Link Between a Coordinator Device and an Identified Destination Device Referring to FIG. 1 and FIGS. 2A-2G, an example 1:1 link constructing process in accordance with various embodiments will be described. As marked, for example on FIG. 2A, by "GD" labels for "good hop" and "BD" labels for "bad hop," example assumes path conditions as set forth on Table 1 below.

TABLE 1

| Path | Good or Bad |
| --- | --- |
| CRD A - RTD B | Good |
| CRD A - RTD C | Good |
| RTD B - RTD C | Bad |
| RTD B - DST D | Bad |
| RTD B - RTD E | Good |
| RTD C - DST D | Bad |
| RTD C - RTD E | Bad |
| RTD E - DST D | Good |

Figure 2A:
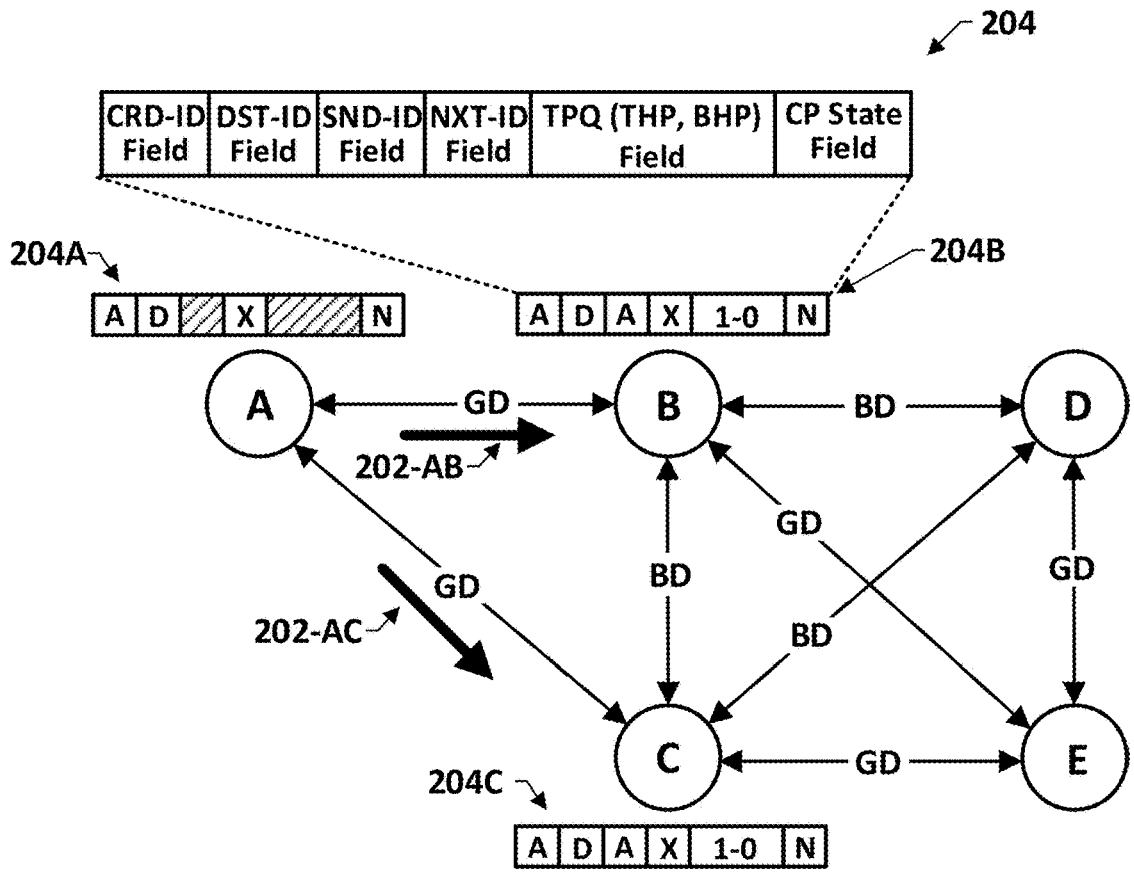
FIGS. 2A-2G show, using an arbitrarily selected example set of reception path conditions in the FIG. 1 topography, an example automatic, distributed constructing in accordance with various embodiments of a best available quality link between the example coordinator device "A" and the example destination node "D," in which FIG. 2A graphically shows an example broadcasting by coordinator device A of a route request (RQS) that reaches, by respective reception paths, the coordinator's neighbors RTD B and RTD C, and shows instantiation of respective route entries in coordinator device A, in RTD B, and in RTD C.

Referring to FIG. 2A routing can begin when the c (A) initiates a new route request. For example, it requests a route from CRD A (also indicated as Node A) to DST D (also indicated as Node D). Node A will broadcast a Route Request. The Route Request contains an identifier of the source, CRD A, and the destination DST D.

TABLE 2A

FIG. 2A

| Node | SRC | SND (PRE) | DST | TLQ TL-BD | NXT | CMP |
| --- | --- | --- | --- | --- | --- | --- |
| A | N/A | N/A | D | | | No |
| B | A | A | D | 1-0 | | No |
| C | A | A | D | 1-0 | | No |
| D | | | | | | |
| E | | | | | | |

In this example, RTD B (hereinafter Node B) & RTD C (hereinafter Node C) receive the broadcast request from Node A. Both Node B & Node C allocate a new Route Record in memory, store the source, destination, the path back to the previous source and start a timer waiting for better paths to arrive. Since this is the first hop, the path from Node A is the only path. Once the timer expires, Node B & Node C will broadcast their own Route Requests.

TABLE 2B

FIG. 2B

| Node | SRC | SND (PRE) | DST | TLQ TL-BD | NXT | CMP |
| --- | --- | --- | --- | --- | --- | --- |
| A | N/A | N/A | D | | | No |
| B | A | A | D | 1-0 | | No |

TABLE 2B-continued

FIG. 2B

| Node | SRC | SND (PRE) | DST | TLQ TL-BD | NXT | CMP |
| --- | --- | --- | --- | --- | --- | --- |
| C | A | A | D | 1-0 | | No |
| D | A | B | D | 2-1 | N/A | No |
| E | A | B | D | 2-0 | | No |

The broadcast Route Requests from Node B & Node C will be received by Nodes B, C, D & E. Node D will receive the requests from Nodes B, C & E. Upon reception, Node D compares each Route Request to find the best path back to the Node A coordinator source and record the route record in memory.

TABLE 2C

FIG. 2C

| Node | SRC | SND (PRE) | DST | TLQ TL-BD | NXT | CMP |
| --- | --- | --- | --- | --- | --- | --- |
| A | N/A | N/A | D | | | No |
| B | A | A | D | 1-0 | | No |
| C | A | A | D | 1-0 | | No |
| D | A | E | D | 3-0 | N/A | No |
| E | A | B | D | 2-0 | | No |

Once Node D's route timer expires it locks in the best path back to the Node A coordinator device. Since Node D is the destination, Node D initiates a Route Response. The Route Response is a direct message sent back to the previous node in the best path, Node B.

TABLE 2D

FIG. 2D

| Node | SRC | SND (PRE) | DST | TLQ TL-BD | NXT | CMP |
| --- | --- | --- | --- | --- | --- | --- |
| A | N/A | N/A | D | | | No |
| B | A | A | D | 1-0 | | No |
| C | A | A | D | 1-0 | | No |
| D | A | E | D | 3-0 | N/A | No |
| E | A | B | D | 2-0 | D | Yes |

TABLE 2E

FIG. 2E

| Node | SRC | SND (PRE) | DST | TLQ TL-BD | NXT | CMP |
| --- | --- | --- | --- | --- | --- | --- |
| A | N/A | N/A | D | | | No |
| B | A | A | D | 1-0 | E | Yes |
| C | A | A | D | 1-0 | | No |
| D | A | E | D | 3-0 | N/A | No |
| E | A | B | D | 2-0 | D | Yes |

TABLE 2F

FIG. 2F

| Node | SRC | SND (PRE) | DST | TLQ TL-BD | NXT | CMP |
| --- | --- | --- | --- | --- | --- | --- |
| A | N/A | N/A | D | | B | Yes |
| B | A | A | D | 1-0 | E | Yes |

TABLE 2F-continued

FIG. 2F

| Node | SRC | SND (PRE) | DST | TLQ TL-BD | NXT | CMP |
|------|-----|-----------|-----|-----------|-----|-----|
| C | A | A | D | 1-0 |     | No |
| D | A | E | D | 3-0 | N/A | No |
| E | A | B | D | 2-0 | D   | Yes |

TABLE 2G

FIG. 2G

| Node | SRC | SND (PRE) | DST | TLQ TL-BD | NXT | CMP |
|------|-----|-----------|-----|-----------|-----|-----|
| A | N/A | N/A | D |     | B   | Yes |
| B | A   | A   | D | 1-0 | E   | Yes |
| C | A   | A   | D | 1-0 |     | No |
| D | A   | E   | D | 3-0 | N/A | No |
| E | A   | B   | D | 2-0 | D   | Yes |

When Node B receives the Route Response from Node D, Node B will add "D" in the "next" column of the route record. Node B will then send a Route Response direct message to Node A. Node A records the "next" column of the route record and the routing process is complete.

TABLE 3

Completed Route Record for Each Node

|        | Source | Destination | Previous | Next |
|--------|--------|-------------|----------|------|
| Node A | A | D | N/A | B |
| Node B | A | D | A   | D |
| Node D | A | D | B   | N/A |

With a complete route, CRD A can send a direct message to DST D using the information in the route record. A communication process for the direct message can comprise, for example, the CRD A first sending the direct RQS message to RTD B. The RTD B, in response, can look up the route record and then retransmit the direct message to Node D end device. The Node D end device can send a message back to CRD A using the reverse process.

Figure 3:
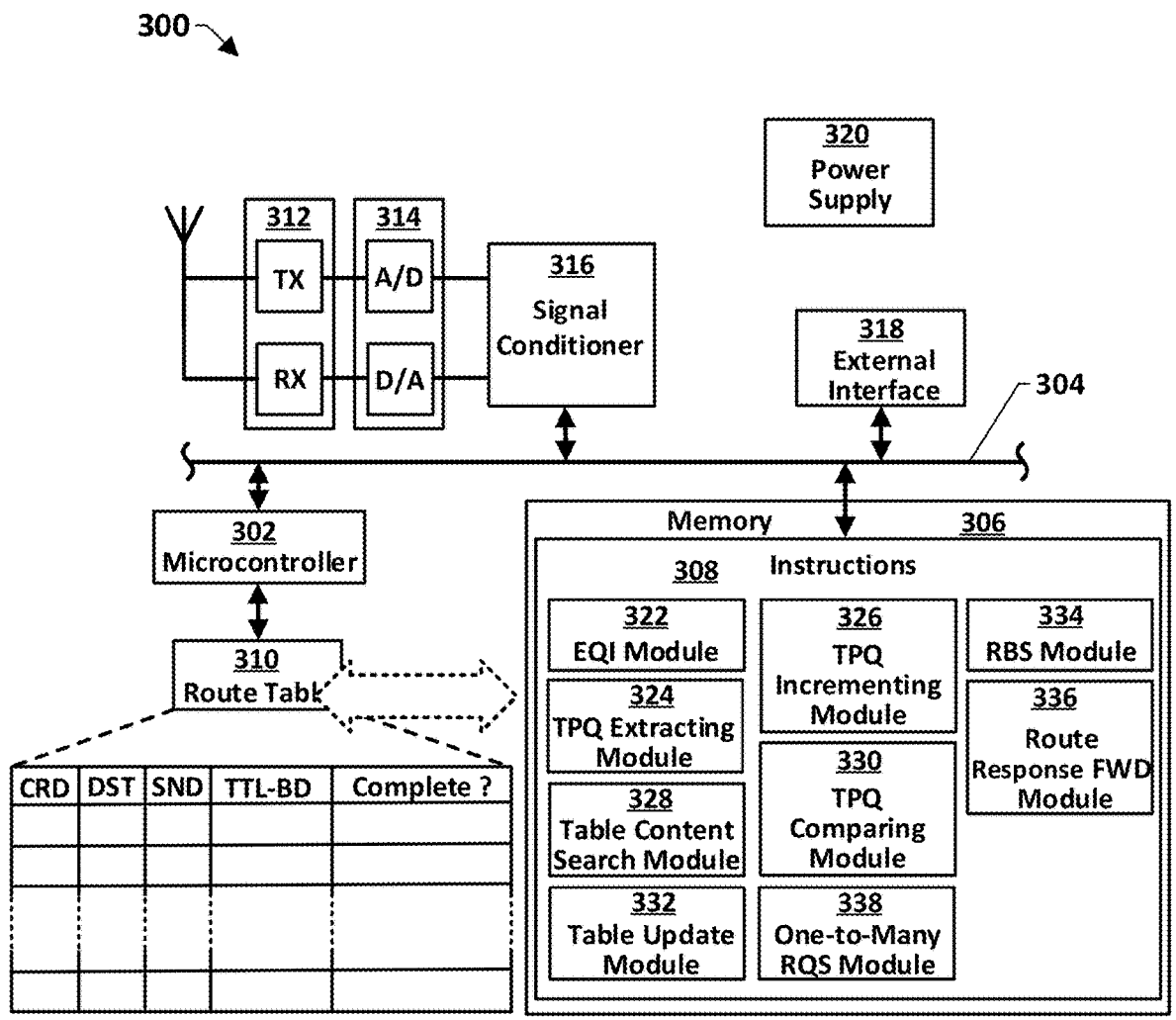
FIG. 3 shows a functional block diagram of one example configuration of an RTD device for systems and methods according to various embodiments.

Example 2—One Example Logic Configuration of a Router Device for Systems and Methods of Distributed Constructing and Storage of Best Available Total Quality 1:1 Links between a Coordinator and an Identified Destination Device FIG. 3 shows a functional block diagram of one example configuration 300 (hereinafter "RTD configuration 300") of an RTD device for implementing, for example, any of or all of the FIG. 1 system 100 RTDs 104, for systems and methods according to various embodiments. As visible, the RTD configuration 300 can include a microcontroller 302 coupled by a bus 304 to a memory resource 306. The memory resource 306 may include an executable instruction memory 308 which, according to various embodiments, may comprise a non-transitory storage medium. The executable instruction memory 308 may be configured, in one or more embodiments, to store a plurality of instruction modules. FIG. 3 shows example instruction modules, described in more detail in subsequent paragraphs. One or more of the instruction modules can configure the microprocessor 302 into a specialized logic with functionalities such as, for example, instantiating and updating in a "route table" 310, up to integer Q routing records. Each of the routing records can be instantiated, for example, in response to the configuration 300 receiving a route request (RQS), from a sending device, requesting a 1:1 hop link, through a mesh of RTDs, from a particular CRD to a particular DST device.

The RTD configuration 300 can further include a wireless transmitter—receiver resource 312 coupled to the system bus 304 through an analog-to-digital ("A/D") and digital-o-analog ("D/A") resource 314 and signal conditioner 316. The RTD configuration 300 can also include an external interface 318 and a power supply 320.

In the FIG. 3 example configuration 300 the instruction modules can include, for example, an "EQI Module" 322, a "TPQ Extracting Module" 324, and a "TPQ Incrementing Module" 326. The EQI Module 322 instructions can configure the microcontroller 302 to compute or detect the RSSI of the received signal, or the bit error rate (BER), and based on comparing the computed value(s) to a threshold classify a reception path as "good" or "bad." The TPQ Extracting Module 324 instructions can configure the microcontroller 302 to extract, e.g., from a received RBS, the sending node's inserted TPQ value, for example a total hops count and a total bad hops count, which can be the total path quality of the hop sequence of which the sender device is an end node. The TPQ Incrementing Module 326 instructions can configure the microcontroller 302 to add the module 322 computed EQI value to the module 324 extracted TPQ value, i.e., to increment the extracted TPQ value to account for the reception path from the RBS sender to the present node.

The FIG. 3 example configuration 300 instruction modules can also include, for example, a "Table Content Search Module" 328, a "TPQ Comparing Module" 330, and a "Table Update Module" 332. According to one or more embodiments, the configuration 300 instruction modules may also include an "RBS Module" 334, a "Route Response Forward (FWD) Module" 336 and can include a "One-to-Many RQS Module" 338.

Figure 4:
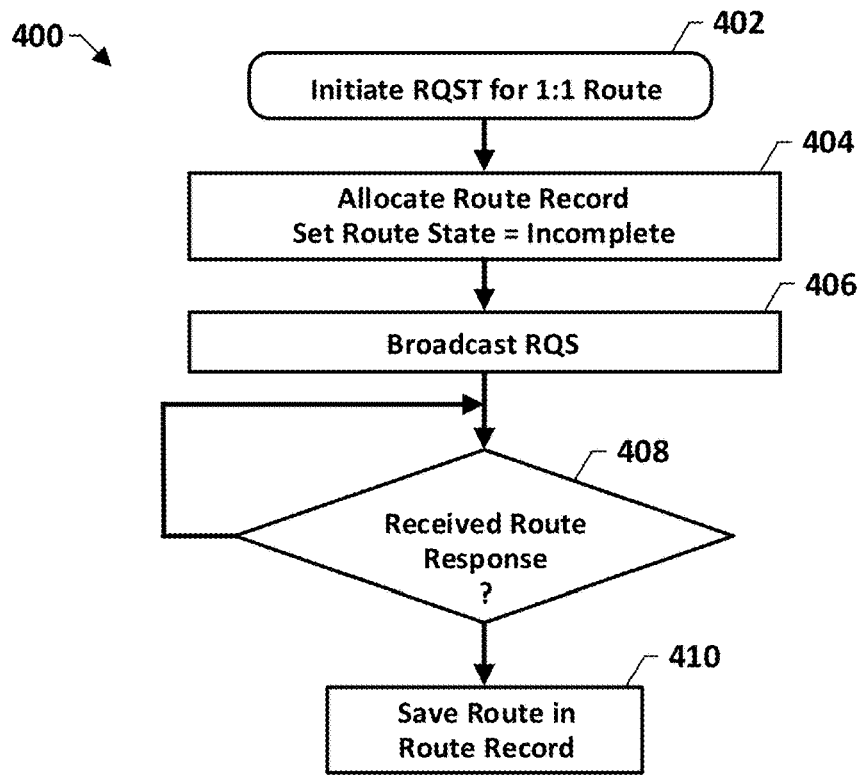
FIG. 4 shows a logic flow diagram of operations in one example process of initiation by a coordinator device of a route request for distributed automatic constructing of a stateless routing engine best quality link according to various embodiments.

Example 3—Example Logic Flow Configurations in Initiating and Monitoring Route Requests FIG. 4 shows a logic flow diagram 400 of operations in one example process (hereinafter "process 400") of initiation by a coordinator device of a route request for distributed automatic constructing of a stateless routing engine best quality link according to various embodiments.

Referring to FIG. 4, operations in the process 400 include the coordinator device initiating 402 a request for a 1:1 hop route through the router devices connecting with a particular destination device. Upon the initiating 402 of the request, the coordinator device can allocate 404 a route record that includes the destination device identifier, and includes a route state indicator set to indicate being incomplete. Operations in the process 400 can proceed from the allocating 404 to broadcasting 406 a route request (RQS), for reception by router devices as described above. Operations in the process 400 can proceed to a logic wait state 408 until the coordinator device receives a route response from the destination device. as described in more detail elsewhere in this disclosure. Upon the coordinator device receiving the route response, operations in the process 400 can proceed from the logic wait 408 to a saving 410 of the route record.

Figure 5:
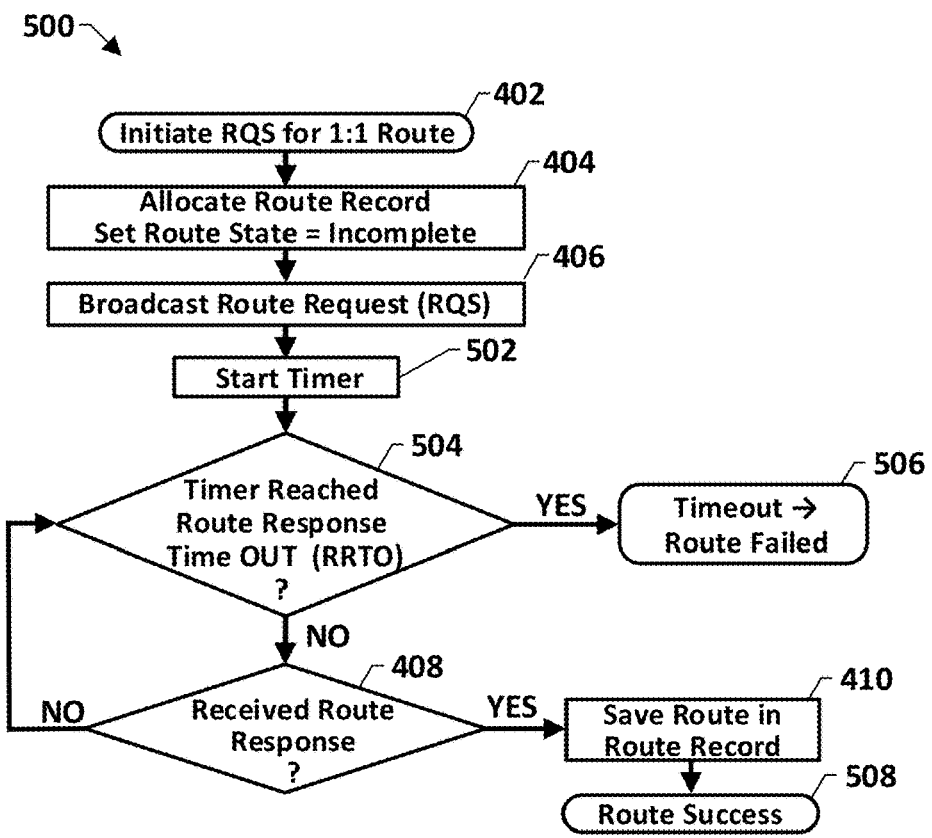
FIG. 5 shows a logic flow diagram of operations in another example process of initiation by a coordinator device of a route request, further comprising timer and time-out features, for distributed automatic constructing and storing of a best quality link path in accordance with various embodiments.

FIG. 5 shows a logic flow diagram 500 of operations in another example process (hereinafter "process 500") of initiation by a coordinator device of a route request, further comprising timer and time-out features, for distributed automatic constructing and storing of a best quality link path in accordance with various embodiments. Referring to FIG. 5, operations in the illustrated process 500 include starting 502 a timer for the coordinator device to detect a time-out, i.e., an excess lapse of time without receiving a route response, an identifying 504 of the timer having reached the timeout. The process 500 includes an identifying 506 of the coordinator device receiving a route response, originated by the destination device in as described above and described in more detail in subsequent paragraphs, and proceeding from the identifying 506 to recording or notifying 508 of a route success.

Figure 6:
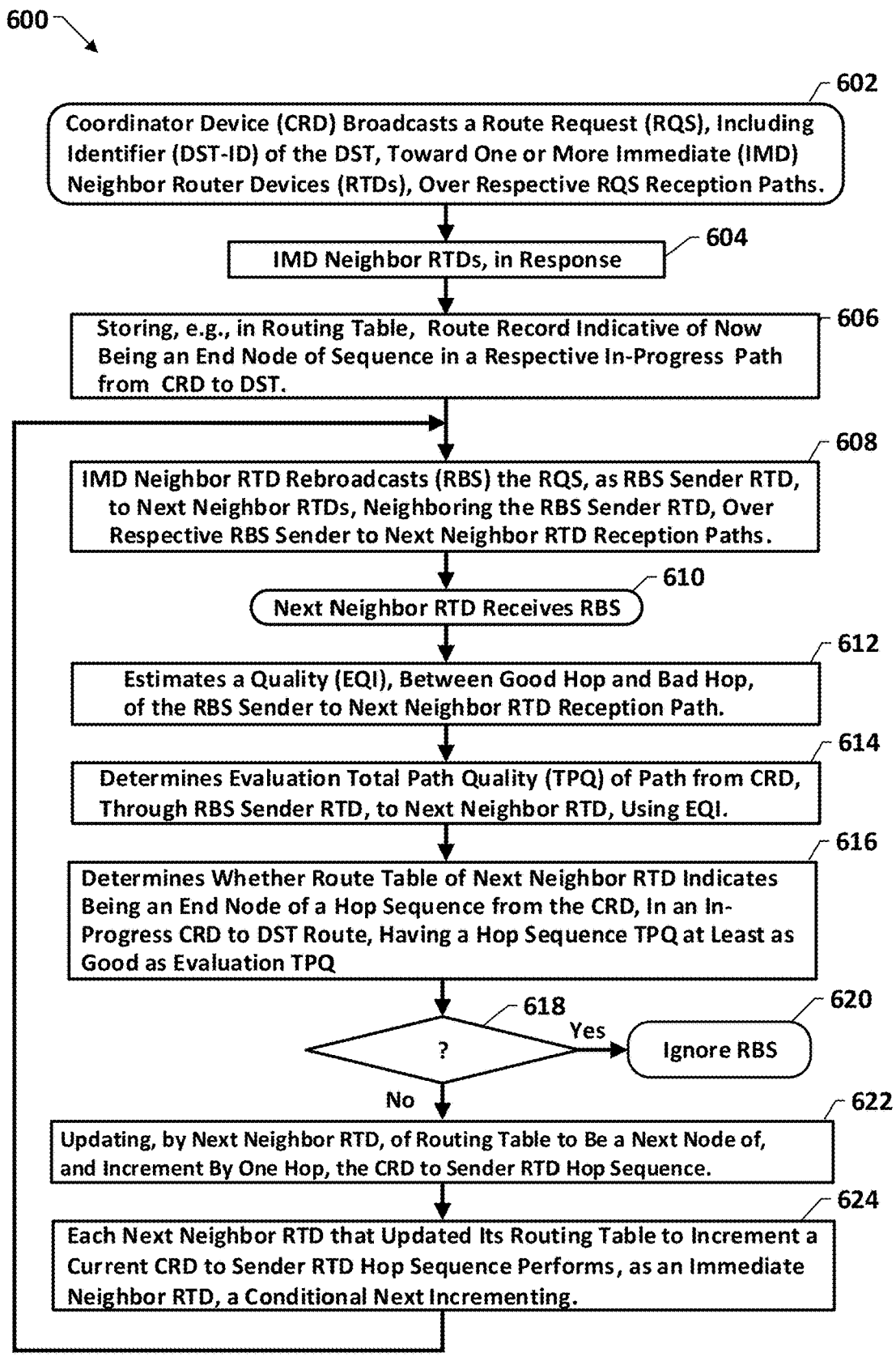
FIG. 6 shows a logic flow diagram of example steps, including automatic instantiating and measured path quality based selective incrementing of hop paths, in a process of distributed constructing best quality 1:1 links in accordance with various embodiments.

Example 4—Example Logic Flow Configurations in RTD Processing of RQS and RBS Reception FIG. 6 shows a logic flow diagram of example router device steps, including automatic instantiation of and present measured path quality based selective incrementing of hop paths, in a configuration 600 (hereinafter "process 600") of a process of constructing best quality 1:1 links in accordance with various embodiments. For purposes of convenience the process 600 will be described with reference to the FIG. 1 system 100 and example operations in FIGS. 2A-2G.

Referring to FIG. 6, operations in the process 600 can start at step 602 with the CRD 102 broadcasting RQS, comprising DST-ID of the DST, to one or more immediate (IMD) neighbor RTDs, over respective RQS reception paths. In the FIG. 2A example, IMD neighbor RTDs can be RTD B and RTD C. In an instance of the process 600, operations can proceed from 602 to instances of IMD neighbor RTDs receiving the step 602 broadcast RQS and, in response, performing a first storing 606, e.g., as a route record in a route table, of indication of now being an end node of a sequence in a respective in-progress path from the CRD 102 to the DST 106. Referring to FIG. 2A, examples of such processing can include the RTD B route record 204B and the RTD C route record 204C.

Figure 2B:
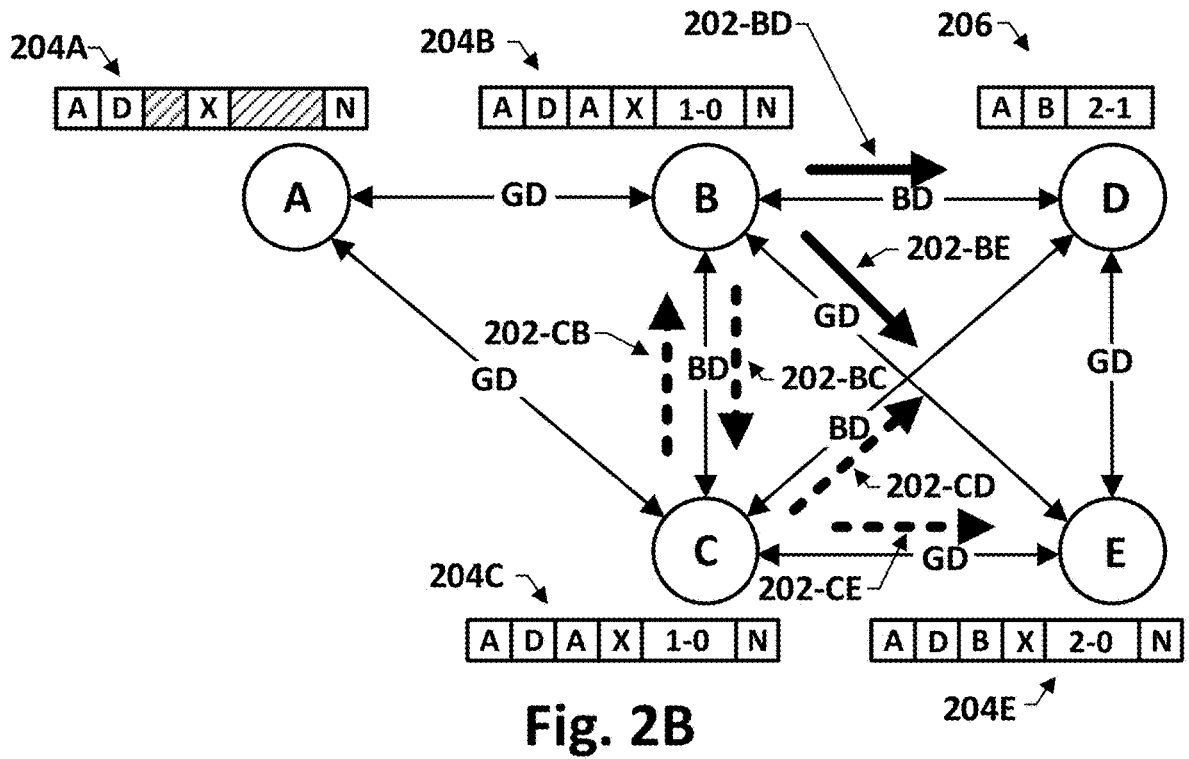
Figure 2C:
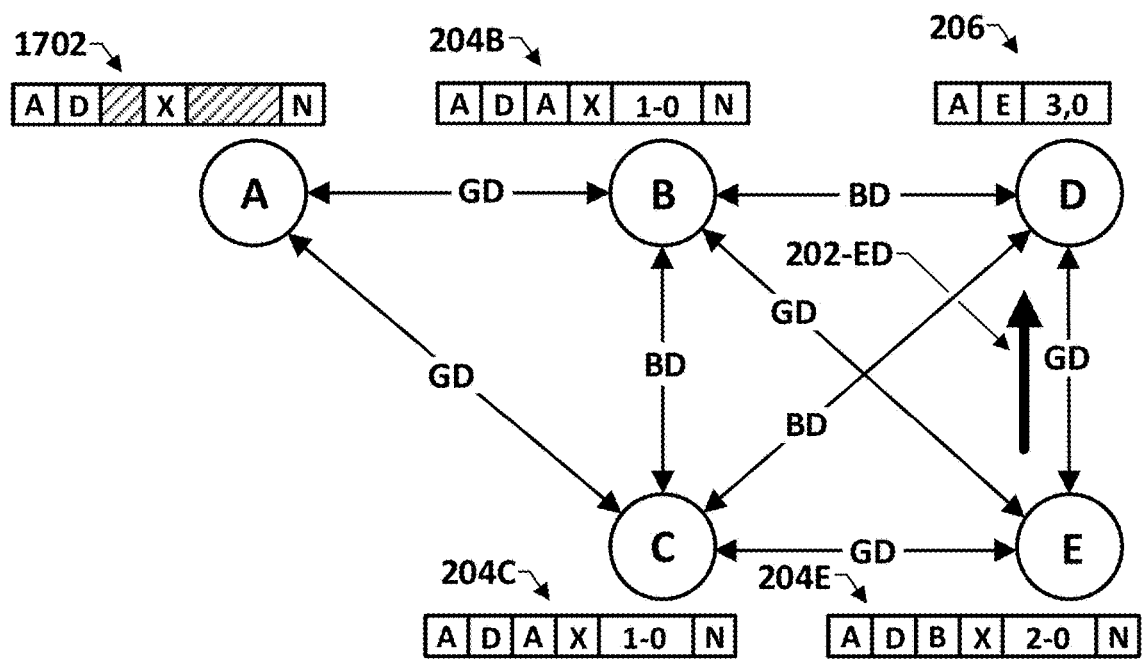
Figure 2D:
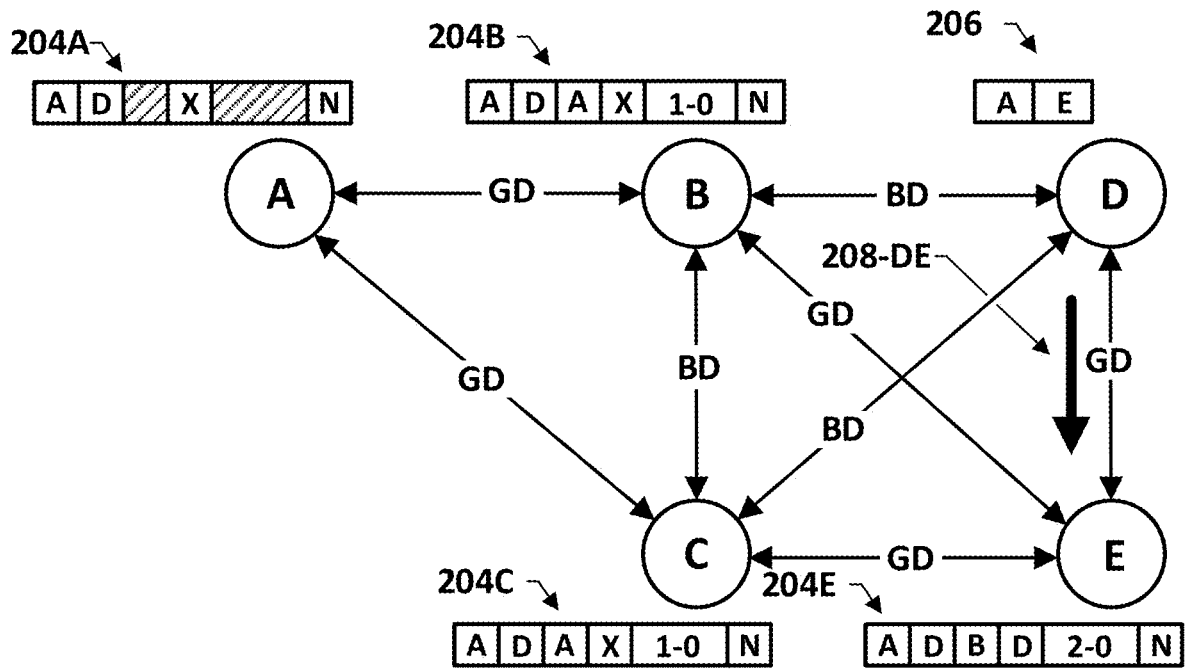
Figure 2E:
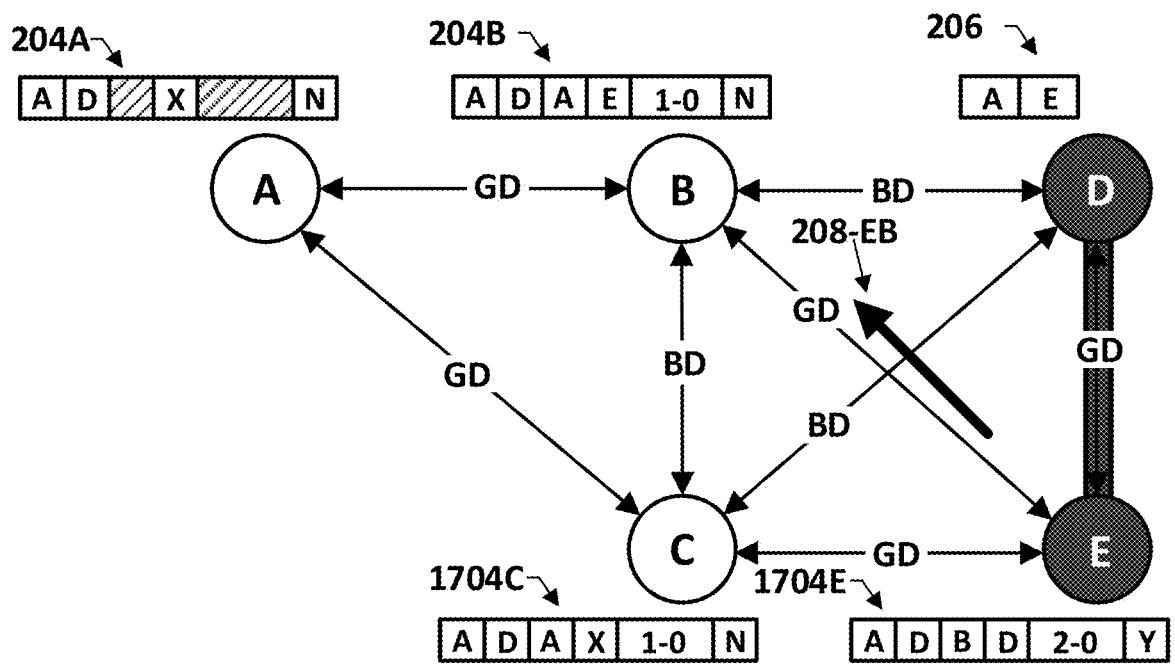
Figure 2F:
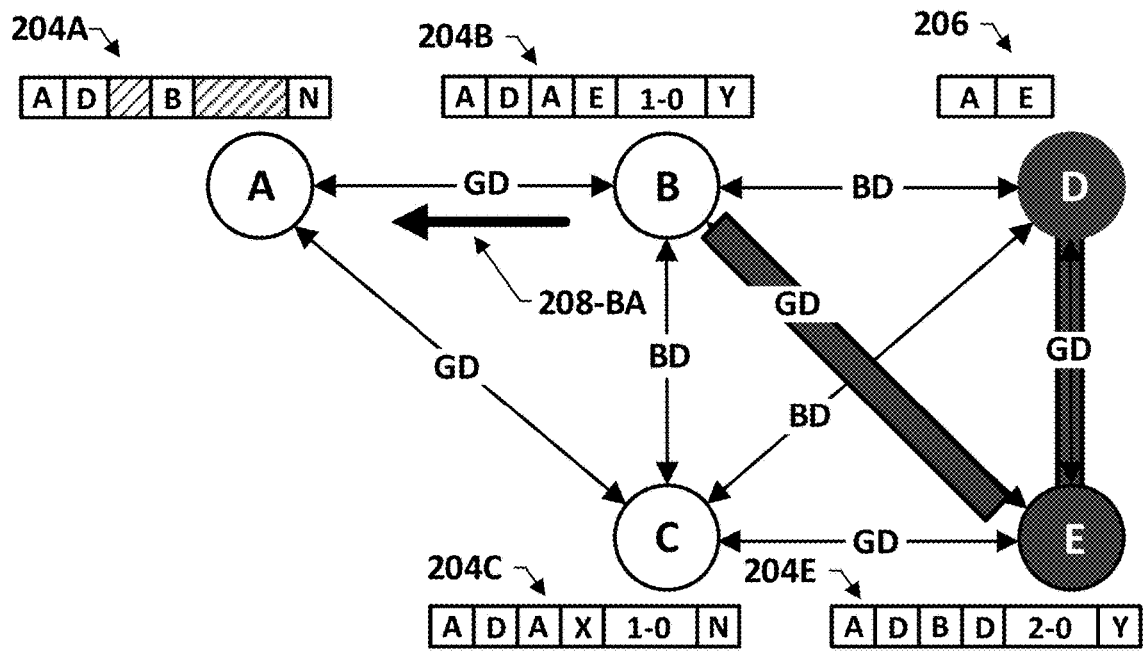
Figure 2G:
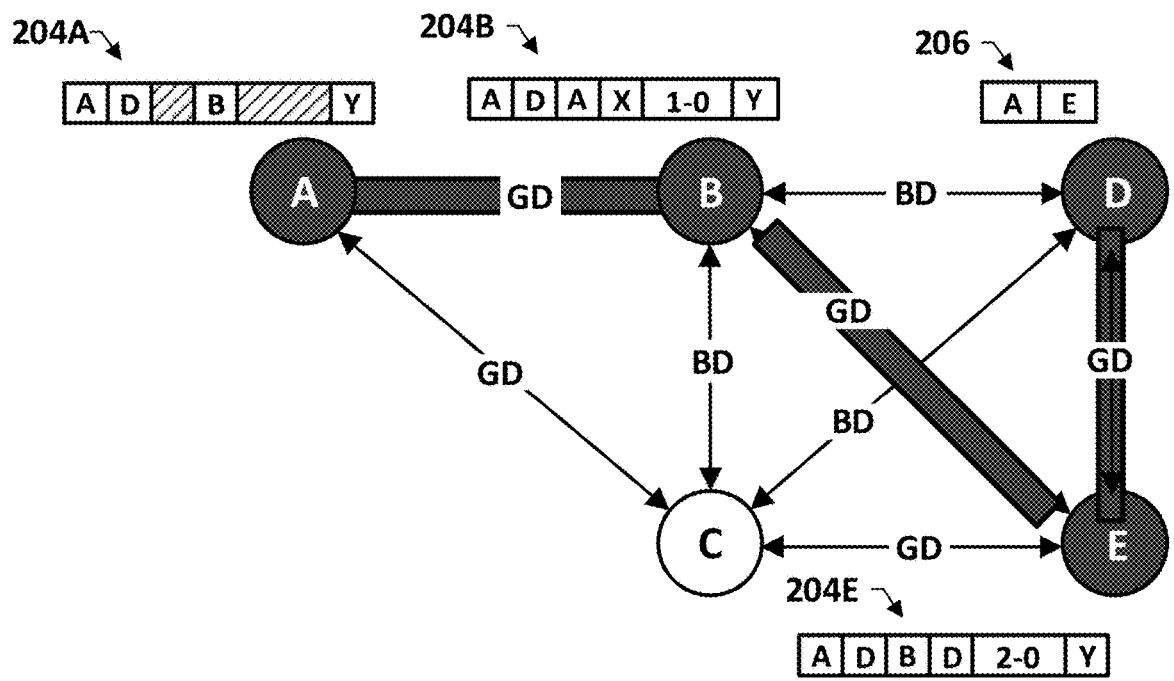

According to various embodiments, operations in the process 600 can proceed from 606 to IMD neighbor RTD rebroadcasting (RBS) 608 the RQS, as an RBS sender RTD, to next neighbor RTDs, neighboring the RBS sender RTD, over respective RBS sender to next neighbor RTD reception paths. Referring to FIG. 2B, examples of such re-broadcasting 608 can include the RTD B to DST D transmission 202-BD over reception path RTD B to DST D, and the RTD B to RTB E transmission 202-BE over reception path RTD B to RTD E. route record 204B and the RTD C route record 204C According to various embodiments, operations in process 600 can proceed from 608 to next neighbor RTD receptions 610 of the neighbor RTD rebroadcasts 608, and responsive to each, performing an estimating 612 of the quality (EQI), between good hop and bad hop, of the RBS sender to next neighbor RTD reception path. Operations in the process 600 can proceed from the estimating 612 to a determining 614 of an evaluation total path quality (TPQ) of a path from the CRD A, through the RBS sender RTD, to the next neighbor RTD, using the EQI value. Operations in the process 600 can proceed from the determining 614 to determine 616 whether shifting to being a next node will obtain a quality improving path in treatment. Operations can comprise, for example, the next neighbor RTD determining whether its route table indicates being an end node of a hop sequence from the CRD, in an in-progress CRD to DST device route, the hop sequence having a hop sequence TPQ at least as good as the evaluation TPQ.

According to one or more embodiments, flow of the process 600 can proceed, responsive to a positive result of the determining 616, to ignoring 620 the RBS. A negative result of the determining at 616 can, in contrast, cause the process 600 to proceed to updating 622 the next neighbor RTD route table to indicate being a next node of the CRD to sender RTD hop sequence. Operations in the process 600 can then proceed, for all next neighbor RTDs that updated their route table at 622, to return to 608 and perform, as an immediate neighbor RTD, a conditional next incrementing.

Example 5—Example Step Flow in RTD Processing of RQS and RBS Reception

Figure 7:
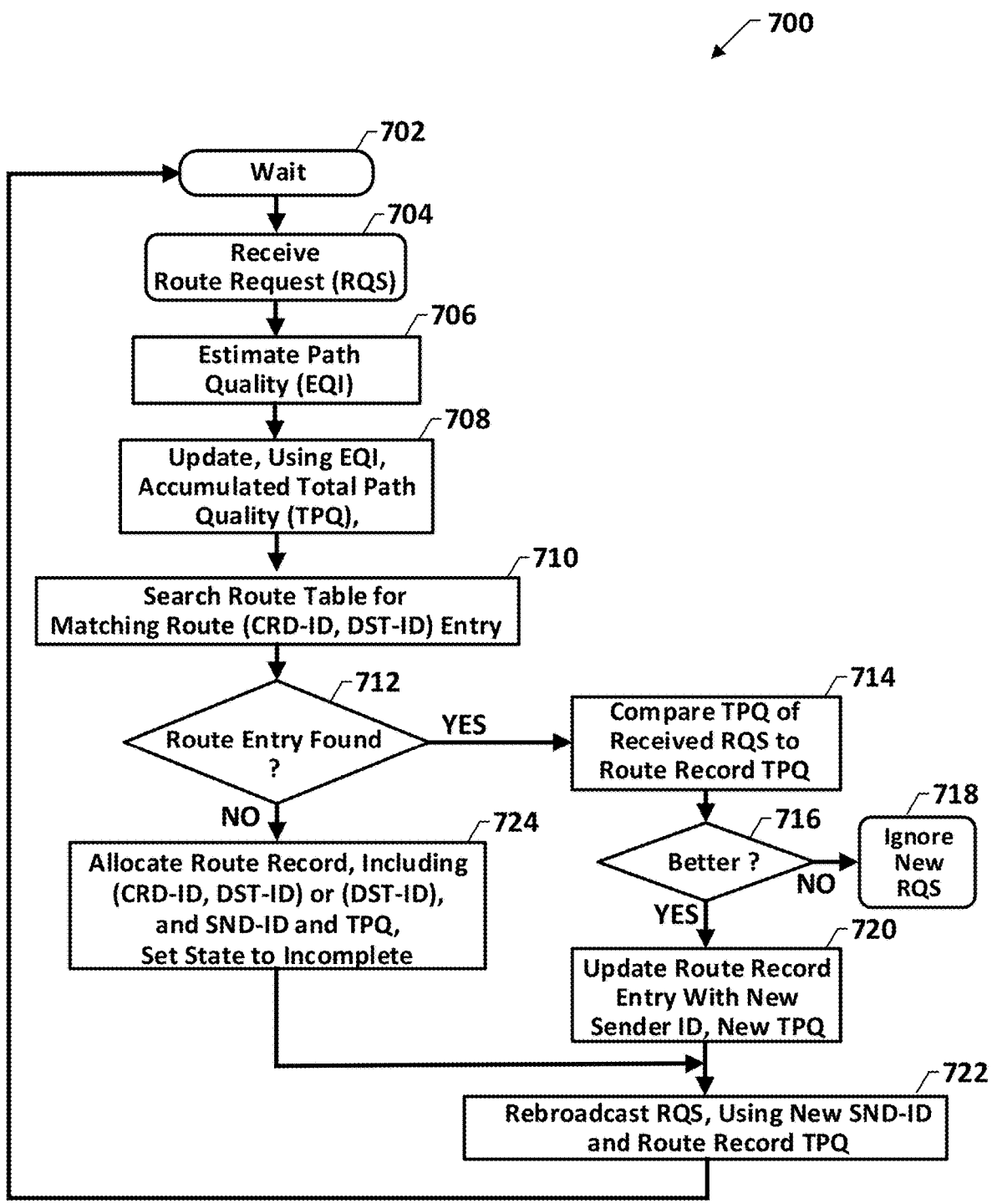
FIG. 7 shows a logic flow diagram of example operations, supported by an example router according to one or more embodiments, for processes of distributed constructing best quality 1:1 links in accordance with various embodiments.

FIG. 7 shows a logic flow diagram 700 of example operations (hereinafter "process 700" . . . ), supported by an example router according to one or more embodiments, for processes of distributed constructing best quality 1:1 links in accordance with various embodiments. Operations in the process 700 can include RTDs 104 waiting 702 then, responsive to receiving 704 the RQS, proceeding to estimate 706 the quality of the reception path. The estimating 706 can be but is not necessarily configured as a binary good hop—bad hop estimation. Operations in the process 700 can then proceed to updating 708 the accumulated total path quality (TPQ) that may be carried by the received RQS. It will be understood that if the received RQS is direct from the coordinator device, there may be no embedded TPQ value, because the RQS traversed no paths prior to the original broadcasts. In such cases the updating 708 can in effect create the TPQ value based on the EQI estimate at 706.

Operations in the process 700 can proceed from the updating 708 to searching 710 the route table for a matching route entry, e.g., a route from the same coordinator device to the same destination device. If such route entry is found, operations in the process 700 can proceed to comparing 714 the TPQ value produced by the updating at 708 against the TPQ of the stored route. If the comparing 714 determines step 708 updated TPQ is not better than the stored TPQ operations in the process 700 can proceed, via branch 716, to ignoring 718 the newly received RQS. If the comparing 714 determines the newly received RQS has a better accumulated TPQ than the accumulated TPQ of the stored route, operations can proceed to updating 720 the route record, to change the current preceding node to the node from which the new RQS was received, and then to rebroadcasting 722 the RQS using the newly computed accumulated TPQ instead of the TPQ of the previous route entry.

Referring to FIG. 7, if the route table searching 712 finds no matching entry, operations can proceed to allocating 724, or instantiating, a new route record, making the sender of the RQS the preceding node and then to rebroadcasting 722 the RQS using the computed accumulated TPQ instead of the TPQ of the previous route entry.

Figure 8:
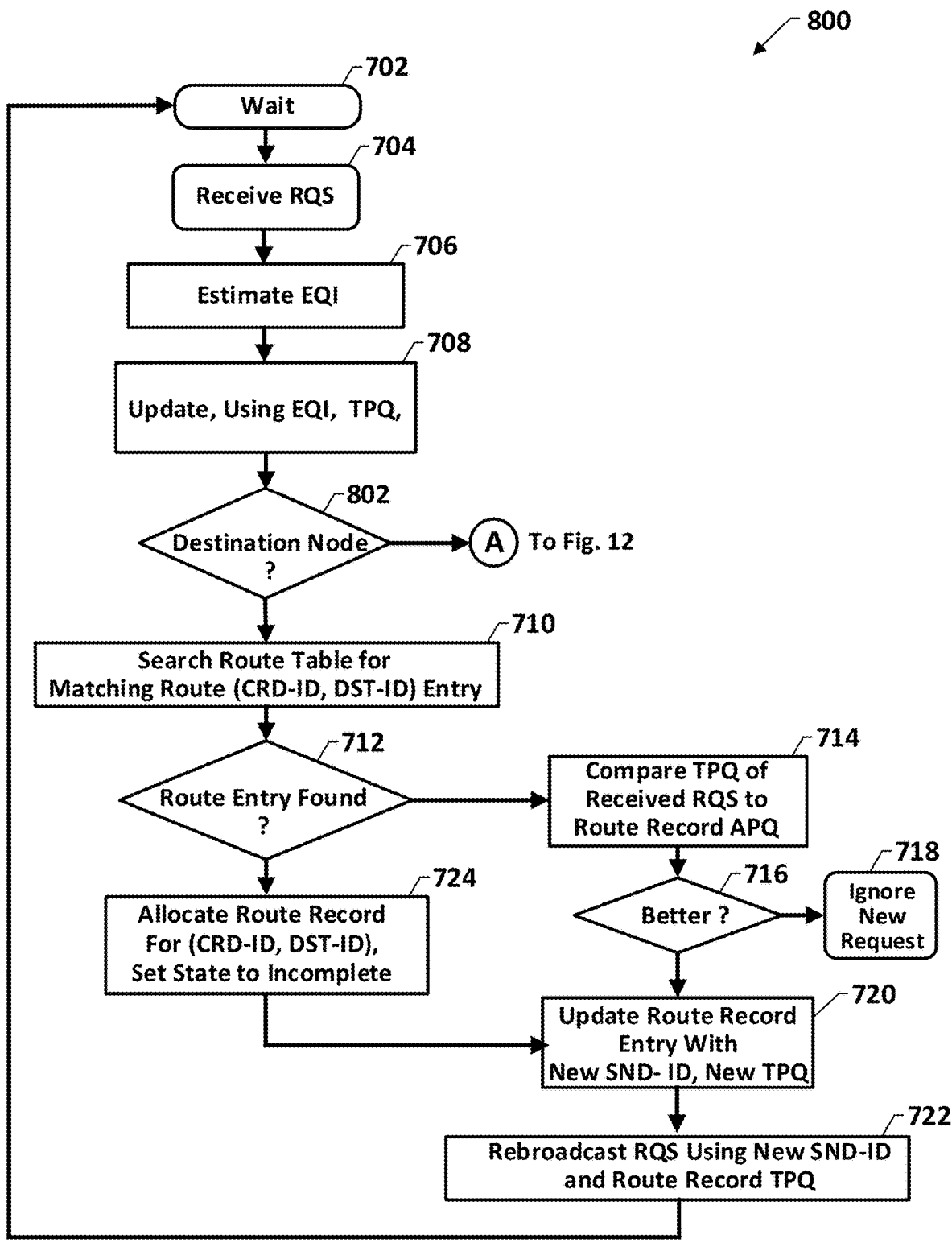
FIG. 8 shows a logic flow diagram of router device steps in one example alternative to the FIG. 7 process further providing, additional to instantiating and path quality based selective incrementing of hop paths, distributed router device constructing of best quality 1:1 links between a coordinator device and a router device, enabling router devices as destination devices in accordance with various embodiments.

Example 6—Example Logic Flow of RTD Steps in RTD Processing of RQS and RBS Reception FIG. 8 shows a logic flow diagram 800 of a configuration of router device steps (hereinafter "process 800"), in one example alternative to the FIG. 7 process providing a feature, additional to instantiating and path quality based selective incrementing of hop paths, for router device constructing of best quality 1:1 links from a coordinator device to a selected router device, i.e., enabling router devices to serve as destination devices in accordance with various embodiments. Referring to FIG. 8, the process 800 adds to the FIG. 7 process 700 a determination 802, immediately after the updating 708 the accumulated TPQ, of whether the router device is the destination device. If the determination 802 result is NO, the process 800 proceeds to searching 710 its route table and continuing as described above for process 700. If the determination 802 result is YES, the process 800 proceeds to the FIG. 12 process 1200 described in later paragraphs.

Example 7—Route Timing and Time-Out Based Erasing

Figure 9:
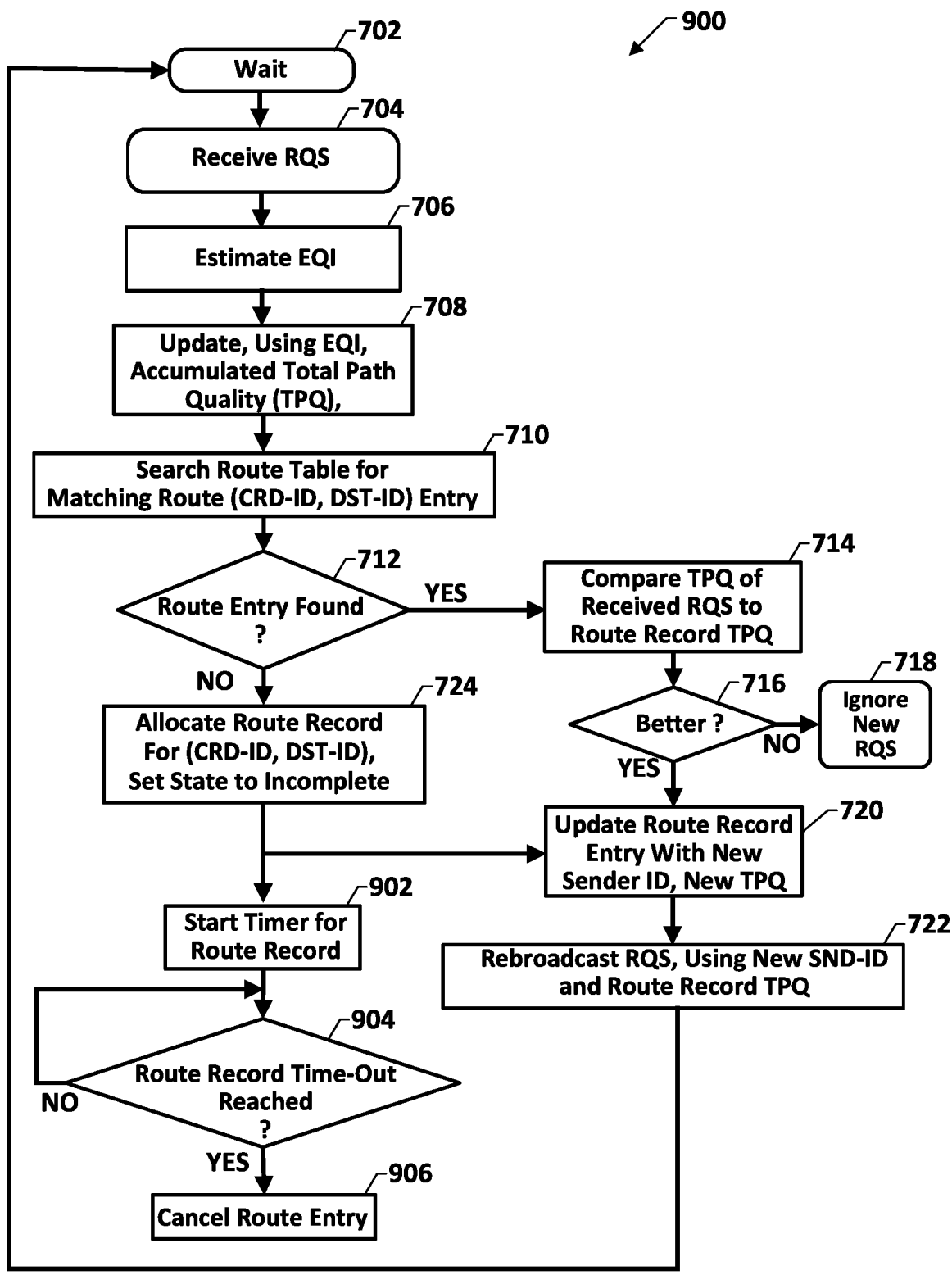
FIG. 9 shows a logic flow diagram of example steps in another example alternative to or adaptation of the FIG. 7 example, further comprising route timing and time-out based erasing of not-completed paths, providing for example and without limitation, increased efficiency in utilizing route table resources, for systems and processes in accordance with various embodiments.

FIG. 9 shows a logic flow diagram 900 of example steps in one adaptation of the FIG. 7 example, further comprising route timing 902 and 904 and time-out based erasing 906 of not-completed paths, for benefits such as, but not limited to, increased efficiency utilizing of route table resources, in systems and processes in accordance with various embodiments.

Figure 10:
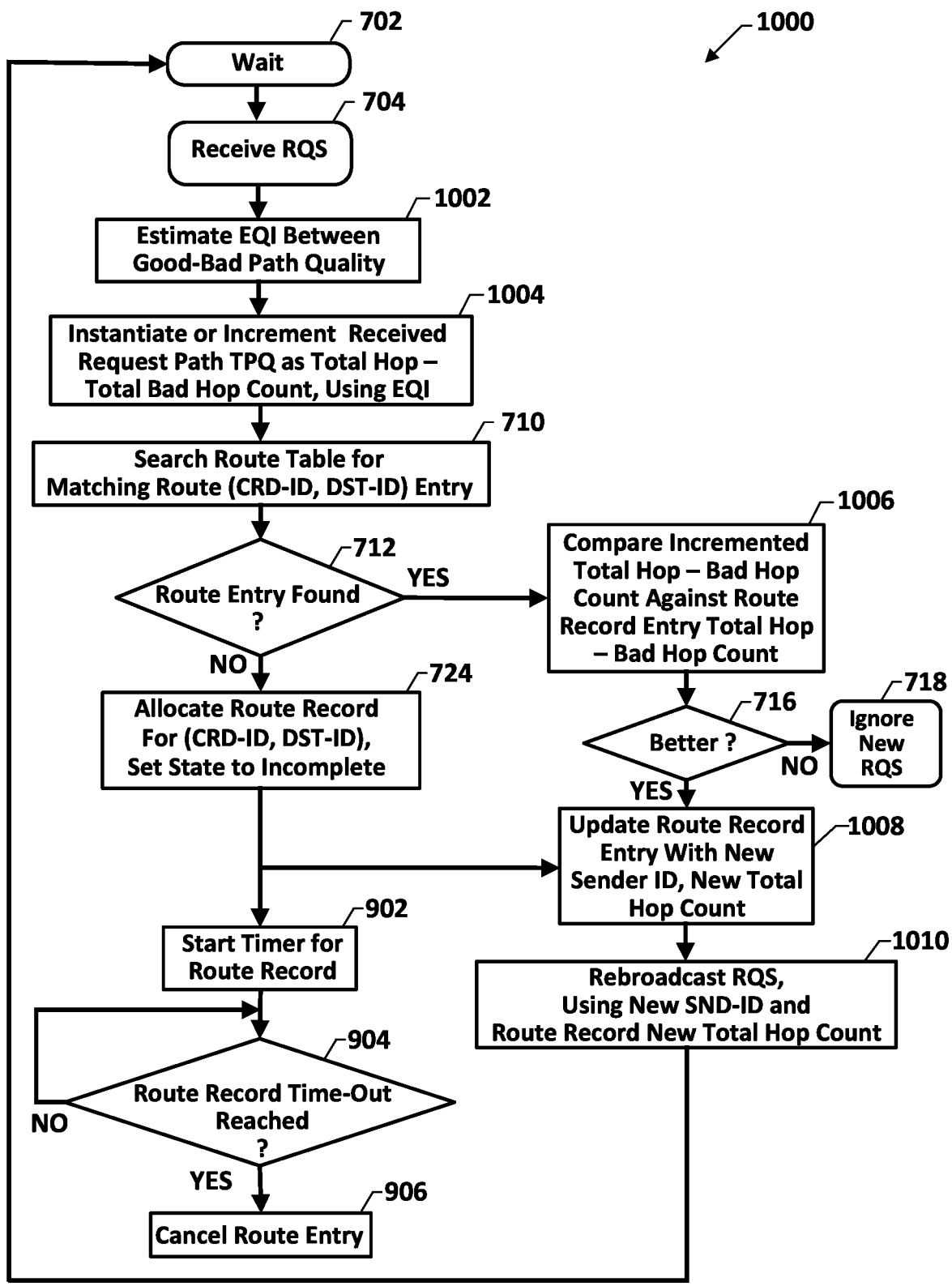
FIG. 10 shows a logic flow diagram, incorporating portions of the FIG. 8 example and including a total hop—bad hop count based quality monitoring in accordance with various embodiments.

FIG. 10 shows a logic flow diagram 1000, incorporating portions of the FIG. 9 example and including a total hop—bad hop count based quality monitoring in accordance with various embodiments.

Figure 11:
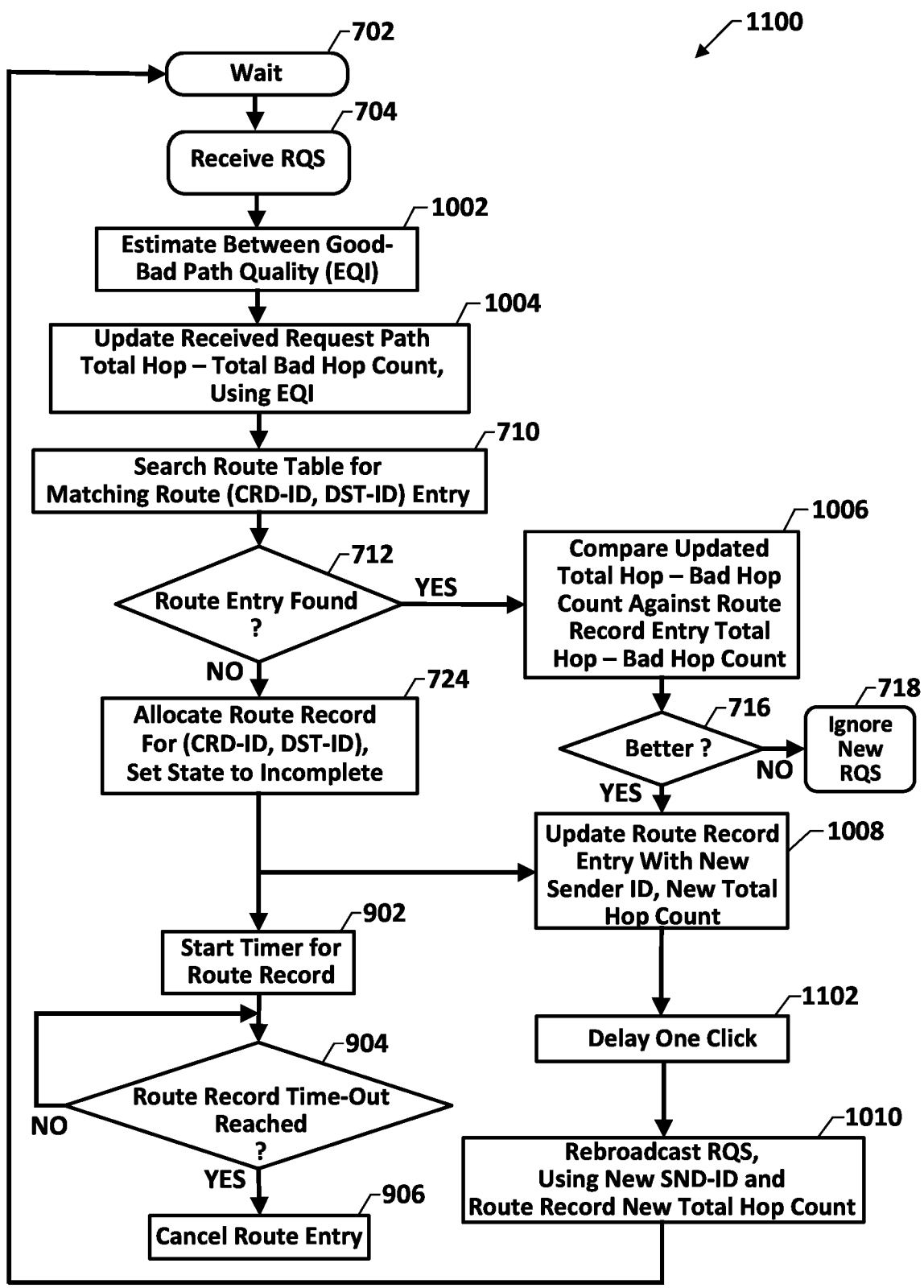
FIG. 11 shows a logic flow diagram of one example modification of the FIG. 9 configuration, further comprising a clock delay feature according to various embodiment.

FIG. 11 shows a logic flow diagram of one example modification of the FIG. 10 configuration, further comprising a clock delay feature 1102 according to various embodiment.

Figure 12:
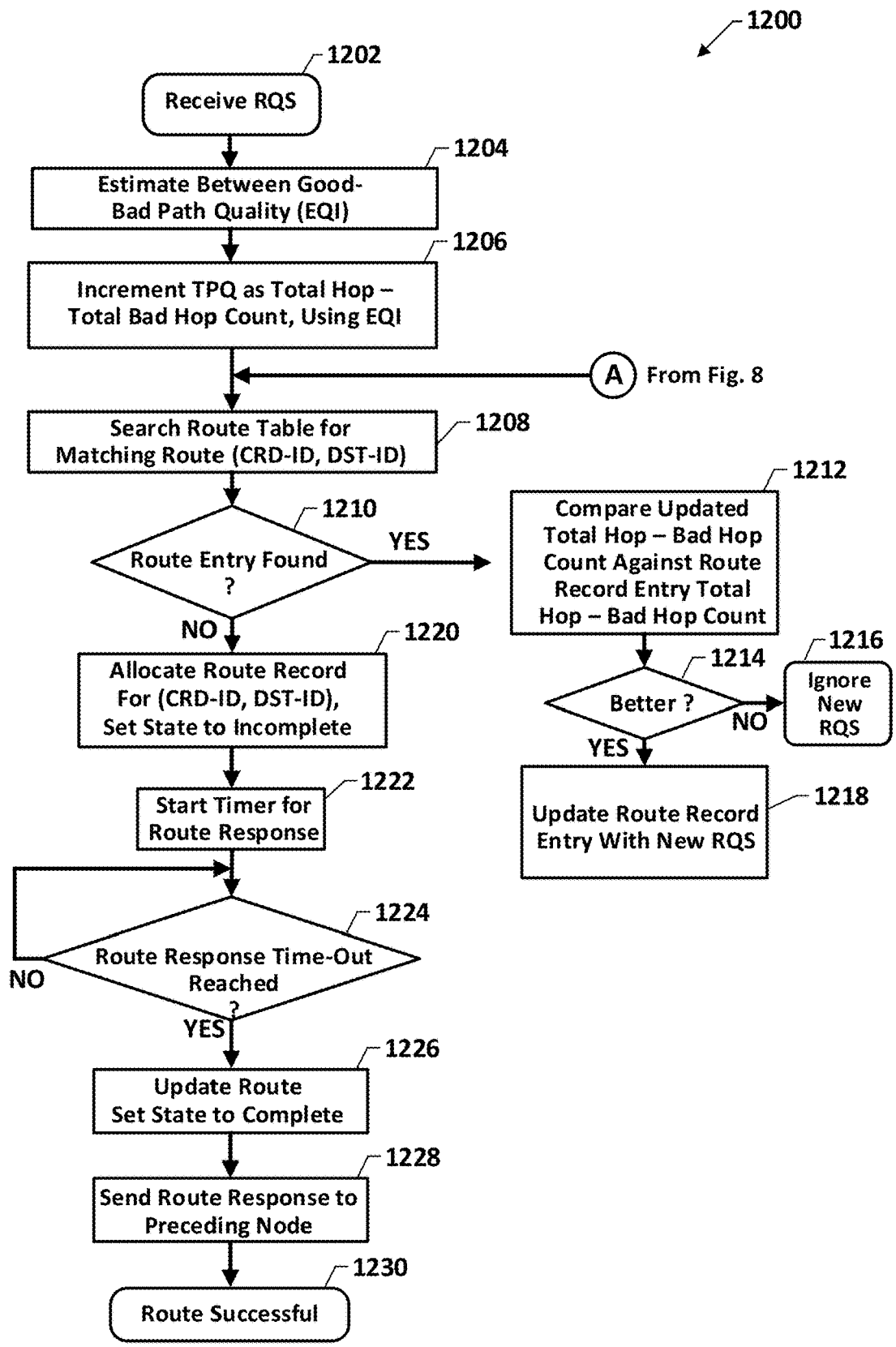
FIG. 12 shows a logic flow diagram of example steps in one process that, according to various embodiments, can be in or on a destination node, providing selecting and node progressing automatic tracing and fixing a best quality path among the forward paths automatically constructed.

FIG. 12 shows a logic flow diagram 1200 of example steps in one process that, according to various embodiments, can be in or on a destination node, providing selecting and node progressing automatic tracing and fixing a best quality path among the forward paths automatically constructed.

Operations in the process 1200 can include the destination node, e.g., a destination device such as a thermostat or a particular one of the routers, the waiting 1202 to receive a route request addressed to the destination node, e.g., as a rebroadcast from a neighboring router as described above. Responsive to receiving the RQS, operations in the process 1200 can proceed to estimate 1204 the quality of the reception path. The estimating 1204 in the FIG. 12 example is shown as a good hop—bad hop classification. Operations in the process 1200 are shown as proceeding from the estimating 1204 incrementing, the accumulated TPQ value carried by the received rebroadcast of the RQS. The incrementing, as described above in reference to FIG. 10, can be based on summing the accumulated total path quality (TPQ) that may be carried by the received RQS with the estimated quality generated at 1204 of the reception path. Operations in the process 1200 can proceed incrementing 1206 to searching 1208 the destination device's route table for a matching route entry, e.g., an earlier received rebroadcast from another router device neighboring the destination device.

Continuing to refer to FIG. 12, if the searching 1208 finds a route entry, a result shown as a YES output from the decision block 1210, operations in the process 1200 can proceed to comparing 1212 the incremented TPQ value produced by the incrementing 1206 against the TPQ of the stored route. If the comparing 1212 determines step 1206 incremented TPQ is not better than the stored accumulated TPQ value operations in the process 1200 can proceed, via branch 1214, to ignoring 1216 the newly received RQS.

If the comparing 1212 determines the newly received RQS has a better accumulated TPQ value than the accumulated TPQ value of the stored route, operations can proceed to updating 1218 the route record, to change the current preceding node to the node from which the new RQS was received.

Referring to FIG. 12, and if the searching 1208 does not find an extant route record, i.e., the received RQS is the first, in terms of time order, RQS addressed to the destination node that said node has received, operations proceed to starting 1222 a timer for a route response, and then to 1214 to wait for expiration of the route response timer. As can be seen from FIG. 12, in the above described example progression to the comparing 1212 the route response timer had already been started but had not yet expired.

When the route response timer expires, operations in the process 1200 proceed via a YES output from decision block 1224 to update 1226 the destination device's route table to indicate its route entry for the connection to the coordinator device being complete. Operations in the process 1200 can then proceed to sending to the preceding router device the response message. The preceding router, as can be readily understood by persons of ordinary skill in the pertinent arts, in view of description above in reference to FIGS. 7, 8, 9, 10, and 11, has a hop path to the coordinator device having a total accumulated TPQ value not less than the best quality accumulated TPQ value of any of the destination device's neighboring router devices.

Figure 13:
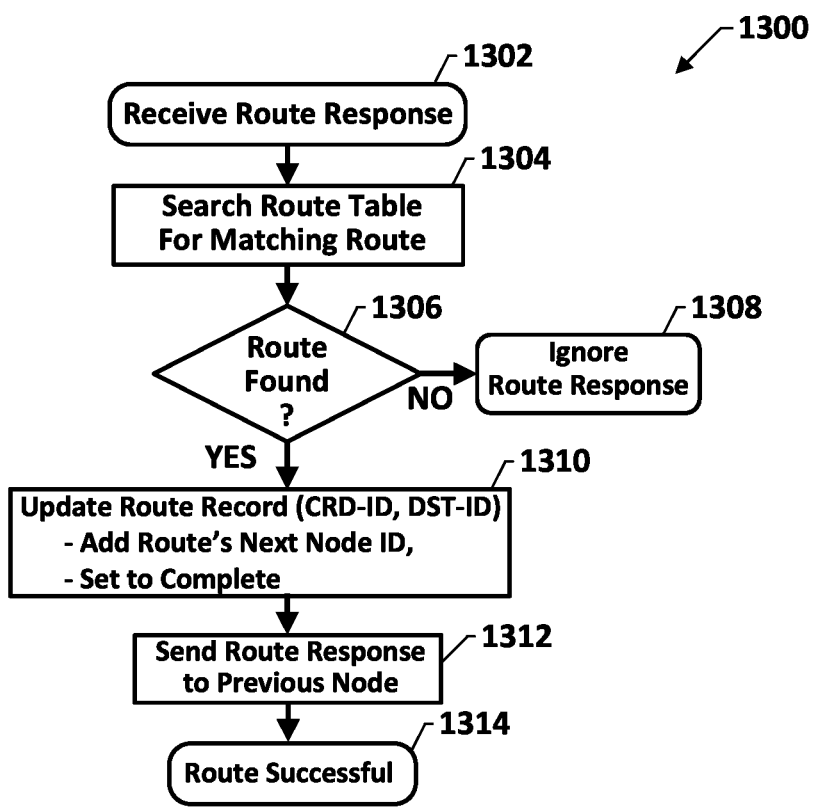
FIG. 13 shows a logic flow diagram of example steps in one process for mesh router devices to receive and forward routing responses for automatic tracing and fixing a best quality link according to various embodiments.

FIG. 13 shows a logic flow diagram 1300 of example steps in one process (hereinafter "process 1300") for mesh router devices to receive and forward routing responses for automatic tracing and fixing a best quality link according to various embodiments. Referring to FIG. 13, the process 1300 can include a mesh router device receiving 1302 a route response and, in response, searching 1304 its route table for a matching route. If the search result 1306 is NO, the process 1300 can ignore 1308 the route response. If the search result 1306 is YES, the process 1300 can proceed to update the route record by adding the source of the route response as the route's next node ID and setting the route record status to "complete." The process 1300 can then proceed to send 1312 a route response to the preceding node, which is stored in the route record. The process 1300 can be repeated at each mesh router device receiving the route response until the response reaches the coordinator device, which will set 1314 its route record to indicate the route construction as successful.

Figure 14:
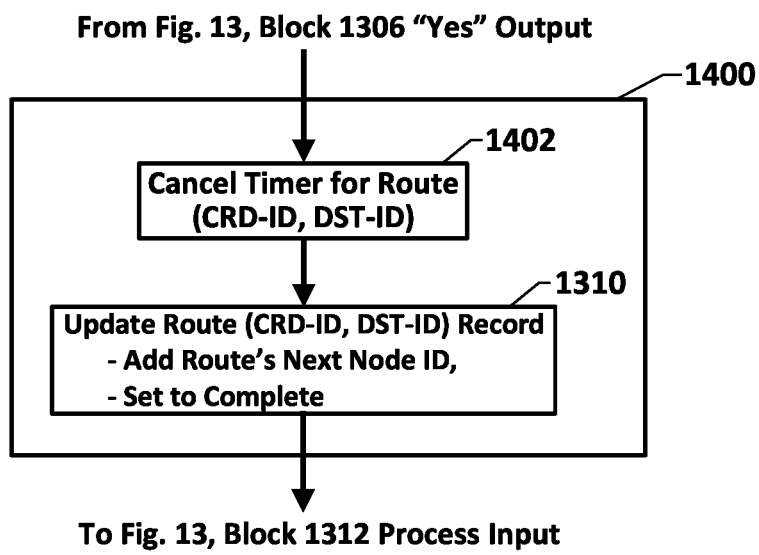
FIG. 14 shows a logic flow diagram of an alternative to the FIG. 12 flow, further providing a timer-based reduction of accumulating stale paths.
Figure 16C:
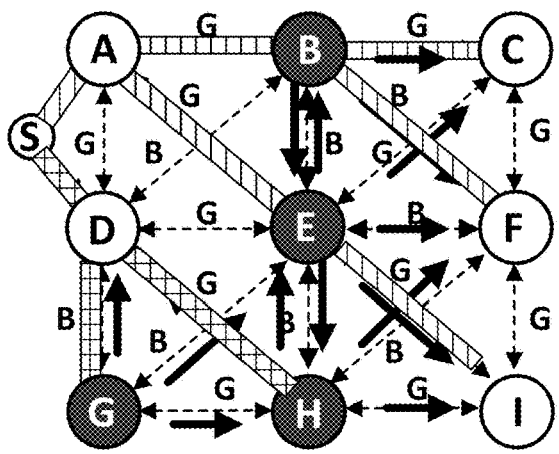
Figure 16D:
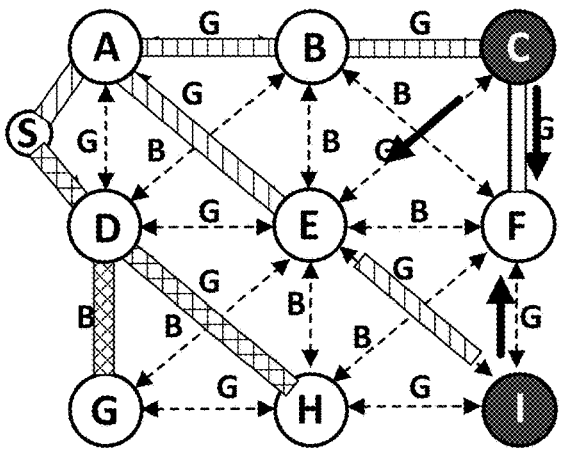
Figure 16E:
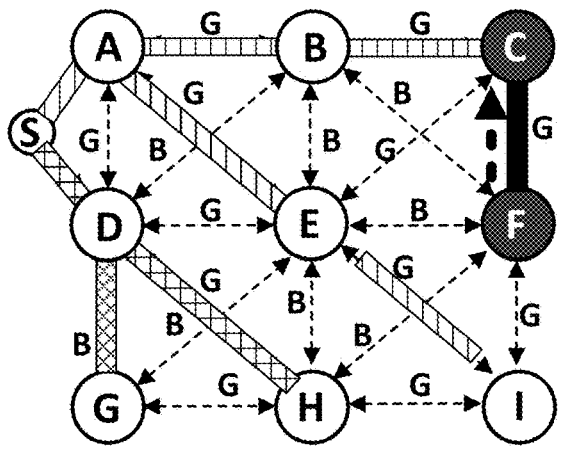
Figure 16F:
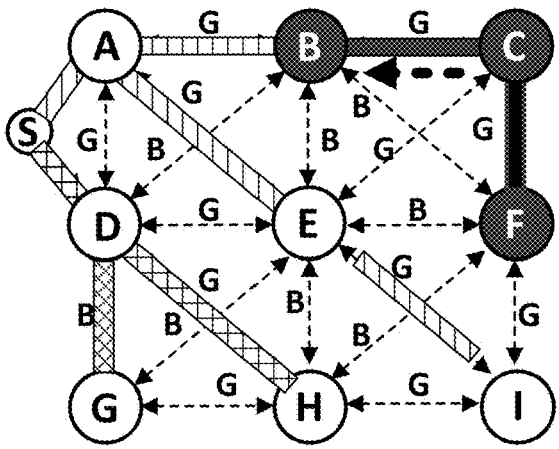
Figure 16G:
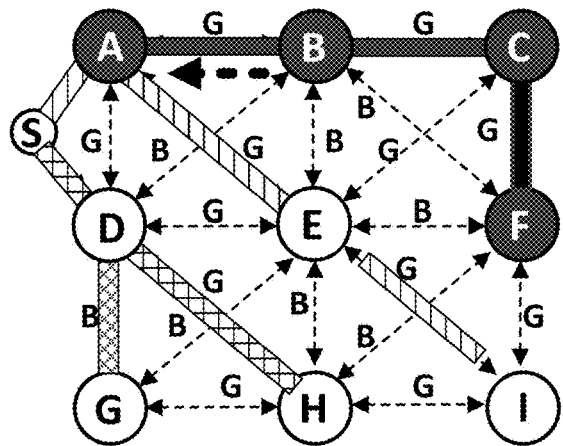
Figure 16H:
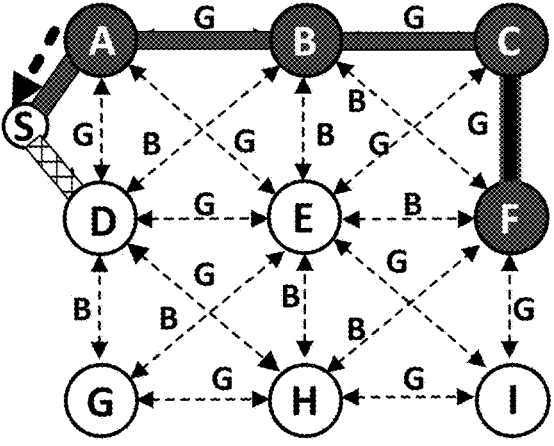

FIG. 14 shows a logic flow diagram 1400 of an alternative to the FIG. 12 flow, further providing a timer-based reduction 1402 of accumulating stale paths.

Figure 17:
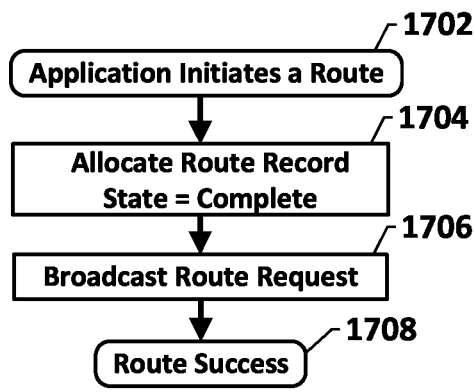
FIG. 17 is a logic flow diagram of example operations in an application layer process initiating a many-to-one route according to various embodiments.

FIG. 15 shows one example logical arrangement 1500 of a route table entry. As visible, the example logical arrangement includes a coordinator identifier field 1502-1, visibly labeled as "CRD-ID"1502-1; a destination device identifier field 1502-2, visibly labeled as "DST-ID"1502-2; a sender identification field, which holds an identifier of the preceding node, visibly labeled as "SND-ID"1502-3; a next node identification field 1502-4, which the preceding node, visibly labeled as "NXT-ID"1502-4; a sender identification field, which the preceding node, visibly labeled as "SND-ID"1502-3; a sender identification field, which holds the preceding node identifier, visibly labeled as "SND-ID"1502-3;

FIG. 17 is a logic flow diagram of example operations in an application layer process initiating a many-to-one route according to various embodiments.

Figure 18:
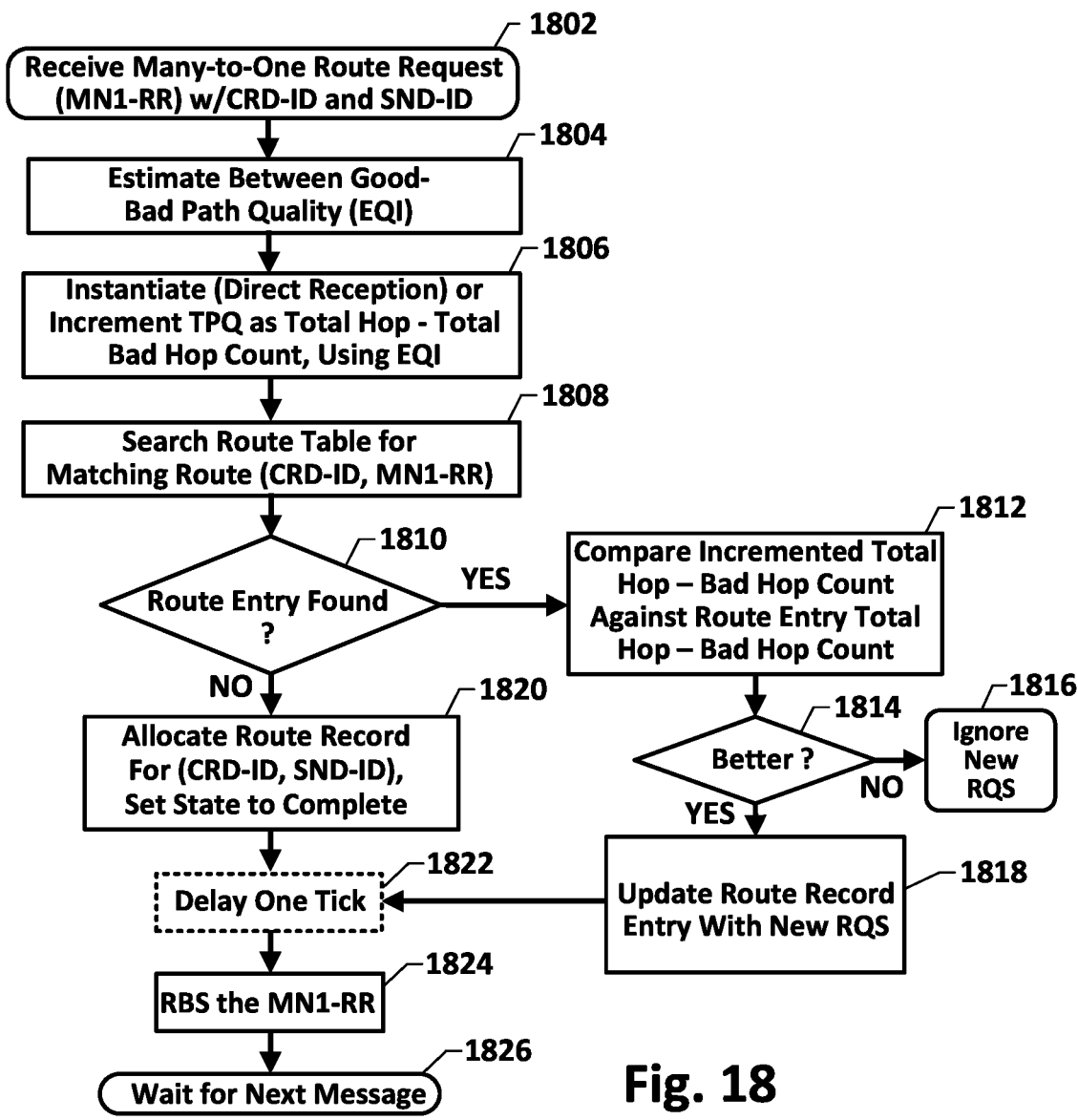
FIG. 18 is a logic flow diagram of example operations on router devices, and adaptable to end devices, in an example process of many-to-one route record instantiation and updating according to various embodiments.

FIG. 18 is a logic flow diagram of example operations on router devices, and adaptable to end devices, in an example process of many-to-one route record instantiation and updating according to various embodiments.

Many To One Routing

Many To One Routing is a special case of ad hoc on-demand distance routing (AODV) routing that creates a one direction route from each node back to the coordinator device. In one more embodiments, a Many to One Route can be created by using, for example, the same Route Request mechanism, and further including a special destination code. The special destination code can be configured to inform each node that this is a one-way route.

Each node creates a Route Record to remember the best path back to the source (coordinator device).

Once the Many to One Route is created, the coordinator device can simply broadcast a request, such as "All nodes please report your status". The nodes will then use the many to one path to send their status back to the coordinator device. This Many-to-One feature can eliminate the need for the coordinator to create a specific route to each node for certain operations.

According to various embodiments, Many to One routing can be additionally utilized in what can be referred to, for purposes of description, as a "Staggered Data Reporting" strategy. Features of Staggered Data Reporting can include a broadcasting e.g., by the coordinator device, of a request instructing all nodes to respond, on node at a time, in a sequence matching, or otherwise corresponding to the numeric position of their respective network ID in an ordered list of the network IDs, with only one node responding at a time. This creates an orderly and predictable network traffic pattern that is very reliable.

TABLE 4

Completed Many to One Route Record for Each Node

|  | Source | Destination | Previous | Next |
| --- | --- | --- | --- | --- |
| Node A | A | N/A | N/A | B |
| Node B | A | N/A | A | N/A |
| Node C | A | N/A | A | N/A |
| Node D | A | N/A | B | N/A |
| Node E | A | N/A | C | N/A |

FIG. 17 is a logic flow diagram of a configuration example operations in an application layer process (hereinafter "Many-to-One Initiating Flow initiating a many-to-one route according to various embodiments.

FIG. 18 is a logic flow diagram of example operations on router devices, and adaptable to end devices, in an example configuration (hereinafter "Many-to-One Flow 2000") of a process for many-to-one route record instantiation and updating according to various embodiments.

Example Differences Between Normal Routing and Many-to-One Routing

Normal Routing creates a bi-directional path between two nodes on the network. Many-To-One Routing creates a unidirectional path from ALL nodes back to one node, usually the coordinator device.

In a one-to-one route, only the nodes that are part of the Route Response will save information about the route. In a Many-To-One route, all nodes save the best path back to the initiator.

There is no "Route Response" propagated back to the route initiator.

Example Uses of Many-to-One Routing

The Many-To-One Routing can be useful, for example, when the coordinator device wants to request data from all the nodes in the network. Referring to FIG. 17, the coordinator device can first initiate 1702 a Many-To-One process. Then the coordinator device can broadcast a single "Send Status" request to all nodes. Each node can then respond in turn by sending its status via the best route back to the coordinator device. According to one or more embodiments, nodes can take turns by order of their assigned network address. For example, a node with address 1 can send first, then node 2 with address 2 can send and so forth. In an embodiment, each node can delay responding by a period of, e.g., time multiplied by its network address. This can reduce congestion on the network.

Further Example Features of Many-to-One Routing

The application layer may initiate all route requests. The roll of the initiating node in a Many-to-One route can be very simple, e.g., initiator only sends out the Many-to-One broadcast message.

The Route Record allocation procedure can first look for unused records. If all records are used, then the oldest route record is re-used.

The "Many" routing nodes react whenever they receive a Many-To-One Route Request.

When a Route Request is received, the receiving node can compare the received RSSI to a fixed threshold to determine if the last hop was a "good" or "bad" hop. The node can then increment the "good hops" value or the "bad hops" value in the request accordingly.

New Route Requests can be compared to that last best Route Request. The new request can be considered better if it has fewer bad hops or the bad hops are equal and has fewer good hops.

Routes can be considered complete as soon as the first route request is received. However, the route can be replaced if a better route request is received later.

Example 8—FIGS. 16A-16H show, using an arbitrarily selected example reception path condition of an abstracted cartesian distributed mesh network of router devices that can function as destination devices, a distributed automatic constructing of a stateless routing engine best quality link according to various embodiments.

TABLE 4A

| | FIG. 16A | | | | | |
| --- | --- | --- | --- | --- | --- | --- |
| Node | SRC | SND (PRE) | DST | TLQ TL-BD | NXT | CMP |
| S | N/A | N/A | F | N/A | | NO |
| A | S | S | F | 1, 0 | | NO |
| B | | | | | | |
| C | | | | | | |
| D | S | S | F | 1, 0 | | NO |
| E | | | | | | |
| F | | | | | | |
| G | | | | | | |
| H | | | | | | |
| I | | | | | | |

TABLE 4B

FIG. 16B

| Node | SRC | SND (PRE) | DST | TLQ TL-BD | NXT | CMP |
|---|---|---|---|---|---|---|
| S | N/A | N/A | F | N/A | | NO |
| A | S | S | F | 1, 0 | | NO |
| B | S | A | F | 2, 0 | | |
| C | | | | | | |
| D | S | S | F | 1, 0 | | NO |
| E | S | A | F | 2, 0 | | NO |
| F | | | | | | |
| G | S | D | F | 2, 1 | | NO |
| H | S | D | F | 2, 0 | | |
| I | | | | | | |

TABLE 4C

FIG. 16C

| Node | SRC | SND (PRE) | DST | TLQ TL-BD | NXT | CMP |
|---|---|---|---|---|---|---|
| S | N/A | N/A | F | N/A | | NO |
| A | S | S | F | 1, 0 | | NO |
| B | S | A | F | 2, 0 | | NO |
| C | S | B | F | 3, 0 | | NO |
| D | S | S | F | 1, 0 | | NO |
| E | S | A | F | 2, 0 | | NO |
| F | S | B | F | 3, 1 | | |
| G | S | D | F | 2, 1 | | NO |
| H | S | D | F | 2, 0 | | NO |
| I | S | E | F | 3, 0 | | NO |

TABLE 4D

FIG. 16D

| Node | SRC | SND (PRE) | DST | TLQ TL-BD | NXT | CMP |
|---|---|---|---|---|---|---|
| S | N/A | N/A | F | N/A | | NO |
| A | S | S | F | 1, 0 | | NO |
| B | S | A | F | 2, 0 | | NO |
| C | S | B | F | 3, 0 | | NO |
| D | S | S | F | 1, 0 | | NO |
| E | S | A | F | 2, 0 | | NO |
| F | S | C | F | 4, 0 | | |
| G | S | D | F | 2, 1 | | NO |
| H | S | D | F | 2, 0 | | NO |
| I | S | E | F | 3, 0 | | NO |

TABLE 4E

FIG. 16E

| Node | SRC | SND (PRE) | DST | TLQ TL-BD | NXT | CMP |
|---|---|---|---|---|---|---|
| S | N/A | N/A | F | N/A | | NO |
| A | S | S | F | 1, 0 | | NO |
| B | S | A | F | 2, 0 | | NO |
| C | S | B | F | 3, 0 | F | YES |
| D | S | S | F | 1, 0 | | NO |
| E | S | A | F | 2, 0 | | NO |
| F | S | E | F | 3, 0 | | |
| G | S | D | F | 2, 1 | | NO |
| H | S | D | F | 2, 0 | | NO |
| I | S | E | F | 3, 0 | | NO |

TABLE 4F

FIG. 16F

| Node | SRC | SND (PRE) | DST | TLQ TL-BD | NXT | CMP |
|---|---|---|---|---|---|---|
| S | N/A | N/A | F | N/A | | NO |
| A | S | S | F | 1, 0 | | NO |
| B | S | A | F | 2, 0 | C | YES |
| C | S | B | F | 3, 0 | F | YES |
| D | S | S | F | 1, 0 | | NO |
| E | S | A | F | 2, 0 | | NO |
| F | S | E | F | 3, 0 | | |
| G | S | D | F | 2, 1 | | NO |
| H | S | D | F | 2, 0 | | NO |
| I | S | E | F | 3, 0 | | NO |

TABLE 4G

FIG. 16G

| Node | SRC | SND (PRE) | DST | TLQ TL-BD | NXT | CMP |
|---|---|---|---|---|---|---|
| S | N/A | N/A | F | N/A | | NO |
| A | S | S | F | 1, 0 | E | YES |
| B | S | A | F | 2, 0 | C | YES |
| C | S | B | F | 3, 0 | F | YES |
| D | S | S | F | 1, 0 | | NO |
| E | S | A | F | 2, 0 | | NO |
| F | S | E | F | 3, 0 | | N/A |
| G | S | D | F | 2, 1 | | NO |
| H | S | D | F | 2, 0 | | NO |
| I | S | E | F | 3, 0 | | NO |

TABLE 4H

FIG. 16H

| Node | SRC | SND (PRE) | DST | TLQ TL-BD | NXT | CMP |
|---|---|---|---|---|---|---|
| S | N/A | N/A | F | N/A | A | YES |
| A | | | | | E | YES |
| B | | | | | C | YES |
| C | S | B | F | | F | YES |
| D | | | | | | |
| E | S | A | F | 2, 0 | | NO |
| F | S | E | F | 3, 0 | | N/A |
| G | | | | | | |
| H | | | | | | |
| I | | | | | | |

A computer program product is an article of manufacture that has a computer-readable medium with executable program code that is adapted to enable a processing system to perform various operations and actions. A computer-readable medium may be transitory or non-transitory. Non-transitory computer-readable media may be understood as a storage for the executable program code. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit. Examples of non-transitory computer-readable media: include removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one, or both of the limits, ranges excluding either or both of those included limits are also included in the invention.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

I claim:

1. A method of distributed automatic constructing of best available 1:1 hop links between a coordinator device (CRD) and a destination (DST) device, through a mesh of router devices (RTDs), comprising:
  a) the CRD broadcasting a route request (RQS), for reception by at least some of the RTDs, the RQS including an identifier (DST-ID) of the DST device, over respective RQS reception paths;
  b) each of the RTDs that receives the RQS, in response:
    1) becoming a respective not complete initial node RTD, of a respective in-progress hop path from the CRD to the DST device, by operations comprising storing a respective route record that includes the DST-ID, identifies the CRD as the respective preceding node, and includes a blank next node identifier field, and
    2) transmitting a respective incrementing rebroadcast (RBS), comprising the RQS, a respective incrementing RBS sender identifier identifying the respective not complete initial node RTD, and configured for reception by a respective another at least some of the RTDs in the mesh each reception of the respective incrementing RBS being over a respective incrementing RBS reception path from the respective not complete initial node RTD;
  c) corresponding to each instance of sub-step (b)(2), each of the respective another at least some of the RTDs, responsive to its respective reception of the respective incrementing RBS, performing, as a respective next incrementing RTD, steps comprising:
    1) extracting from the received incrementing RBS the DST-ID and the respective incrementing RBS sender identifier,
    2) estimating, as a respective estimated path quality value, between good hop and bad hop, of the respective incrementing RBS reception path from the respective not complete initial node RTD to the next incrementing RTD,
    3) determining, as an evaluation accumulated total path quality (TPQ) value, a quality of a candidate hop path from the CRD, through the respective not complete initial node RTD to the respective incrementing RTD, based at least in part on the respective estimated path quality value,
    4) determining whether the respective incrementing RTD stores a respective current better route record information, wherein the respective current better route record information indicates the respective incrementing RTD being a not complete node of in-progress hop connection from the CRD to the DST device and having an extant-hop sequence connection to the CRD having an accumulated TPQ value at least as good as the evaluation accumulated TPQ value, and
    5) responsive to a result of step 4) not indicating the respective incrementing RTD stores the current better route record information the respective incrementing RTD:
      becoming a respective not complete next node RTD, succeeding the respective not complete initial node RTD, in the respective in-progress hop path from the CRD to the DST device, by storing a new route record that includes the DST-ID, identifies the respective not complete initial node RTD as the respective preceding node, includes a respective blank next node identifier field, and indicates having a respective hop sequence connection from the CRD with a respective accumulated TPQ value, which is equal to the evaluation accumulated TPQ value, and
      transmitting a respective next incrementing RBS, comprising the RQS, a respective next incrementing RBS sender identifier identifying the respective not complete next node RTD, and configured for reception by a respective next another at least some of the RTDs in the mesh, each reception of the respective next incrementing RBS being over a respective next incrementing RBS reception path from the respective not complete next node RTD.

2. The method of distributed automatic constructing of best available 1:1 hop links between a CRD and a DST device, through the mesh of RTDs according to claim 1, wherein:
  the sub-step (c)(3) determining the evaluation accumulated TPQ value is configured to output the evaluation TPQ value formatted as a respective pair of integers, the respective pair of integers comprising a respective total hop count integer and a respective bad hop count integer, and the method further comprises,
(d) corresponding to each instance of sub-step (c)(5) transmitting the respective next incrementing RBS, each of the respective next another at least some of the RTDs, responsive to its respective reception of the respective next incrementing RBS, performing, as a respective subsequent next incrementing RTD, steps comprising
1) extracting from the received next incrementing RBS the DST-ID, the respective next incrementing RBS sender identifier, the respective total hop count integer and the respective bad hop count integer,
2) estimating, as a respective another respective estimated path quality value, between good hop and bad hop, of the respective next incrementing RBS reception path from the respective not complete next node RTD to the respective subsequent next incrementing RTD,
3) determining, as a respective another evaluation accumulated TPQ value, a quality of a respective candidate hop path from the CRD, through the respective not complete next node RTD to the-respective subsequent next incrementing RTD, based at least in part on the respective estimated path quality value, a respective evaluation total hop counter integer value and a respective bad hop count integer value, comprises steps of:
setting the respective total hop count integer based on a summing of the one hop from the CRD to the RBS sender and the one hop from the RBS sender to the RTD, and
setting the bad hop count integer at a value based at least in part on a summing of the preceding hop sequence bad hop count integer and sub-step (c)(2) estimated path quality value.

3. The method of distributed automatic constructing of best available 1:1 hop links between a CRD and a DST device, through the mesh of RTDs according to claim 1, wherein:
the sub-step (b)(1) further comprises, prior to storing the respective route record the RTD estimating a quality value, between good hop and bad hop, of the respective RQS reception path from the CRD to the respective not complete initial node RTD;
the sub-step (b)(2) respective incrementing RBS further includes a respective TPQ value, based at least in part on the estimated quality value of the respective RQS reception path from the CRD;
sub-step (c)(1) further comprises extracting, as a respective accumulated prior path TPQ value, the respective TPQ value from the received incrementing RBS; and
the sub-step (c)(3) determining the evaluation accumulated TPQ value is further based at least in part on a summing of the sub-step (c)(1) respective accumulated prior path TPQ value and the sub-step (c)(2) respective estimated path quality value.

4. The method of distributed automatic constructing of best available 1:1 hop links between a CRD and a DST device, through the mesh of RTDs according to claim 1, wherein:
step (b)(1) further comprises each of the RTDs that receives the RQS:
estimating, as a respective estimated initial path quality value, between good hop and bad hop, of its respective RQS reception path from the CRD,
including in the respective route record an initial path reception quality value, comprising an initial hop count integer and an initial bad hop count integer, the initial hop count integer being 1 and the initial bad count integer being indicative of the respective estimated initial path quality value,
the sub-step (b)(2) respective incrementing RBS further includes the respective estimated initial path quality value,
sub-step (c)(1) further comprises extracting from the received initial RBS of the RQS, as a respective extracted initial accumulated TPQ value, the respective estimated initial path quality value, and
the sub-step (c)(3) determining the evaluation accumulated TPQ value is further based at least in part on a summing of the respective estimated path quality value and the respective extracted initial accumulated TPQ value.

5. A system for automatic link-condition adaptive, non-controller-centric distributed establishing of best hop sequence paths to specifiable destination devices in a mesh network including router devices (RTDs), a controller device (CRD), and a destination (DST) device, wherein
the RTDs include router wireless transmit-receive resources coupled by a router bus to a programmable router processing logic and to a router memory, the router memory including a non-transitory router instruction memory,
the CRD includes CRD wireless transmit-receive resources coupled by a CRD bus to a programmable CRD processing logic and to a CRD memory, the CRD memory including a non-transitory CRD instruction memory,
the DST device includes a DST wireless transmit-receive resources coupled by a DST device bus to a programmable DST device processing logic and to a DST device memory, the DST device memory including a non-transitory DST device instruction memory,
the CRD processing logic is further configured by a route request (RQS) generating instruction module in its non-transitory CRD instruction memory to generate and cause its CRD wireless transmit-receive resources to transmit to the mesh network a RQS that includes an identification (DST-ID) of the DST device,
the RTD processing logic is further configured by a conditional rebroadcasting (RBS) instruction module in its non-transitory RTD instruction memory, to become, in response to the RTD's reception of the RQS, a respective incrementing RTD and perform steps comprising
storing in the RTD memory a respective route record, including DST-ID, and include an indication of the CRD as its respective preceding mode, and to include a respective blank next node field, indicating being a not complete initial node in a respective in-progress hop path from the CRD to the DST device, and
cause its RTD wireless transmit-receive resources to transmit a rebroadcast (RBS) of the RQS, the RBS of the RQS identifying the respective incrementing RTD as the RBS sender and configured for reception by one or more RTD neighbors of the RBS sender, the reception by each of the one or more RTD neighbors being over a corresponding reception path from the RBS sender;
the RTD processing logic is still further configured by the RBS instruction module in its non-transitory RTD instruction memory to perform, in response to each reception by its RTD wireless transmit-receive resources of any RBS of the RQS, as a next incrementing RBS sender a next incrementing RBS process, including to:
- estimate a candidate quality (EQI), between good hop and bad hop, of the RBS sender neighbor RTD's reception path from the RBS sender,
- determine, as a candidate total path quality (TPQ), a quality of a candidate hop path from the CTD, through the RBS sender to the RBS sender neighbor RTD, based at least in part on the candidate EQI,
- detect whether a route table of the RBS sender neighbor RTD indicates a hop connection to the CPT by an extant hop sequence having a hop sequence TPQ at least as good as the candidate TPQ and being in an in-progress CRD to DST device path, responsive to a negative outcome of the detection, to cause the RBS sender neighbor RTD incrementing the extant hop sequence from the CPT to the RBS sender by appending the RBS sender neighbor RTD as a next node, by steps comprising
  - updating the RBS sender neighbor RTD's routing table to indicate the RBS sender as the RBS sender neighbor RTD's preceding node and to include an incremented TPQ indicating an accumulated TPQ of a hop sequence from the CRD to the RBS sender neighbor RTD, based on the candidate TPQ, and
  - cause the router wireless transmit-receive resources to transmit a next incrementing RBS update its route table performing a conditional incrementing of its corresponding incremented hop sequence.

6. A method of distributed automatic link-condition-adaptive establishing of best communication paths through a mesh network including router devices (RTDs), between a coordinator device (CRD) and a destination (DST) device comprising:

a) during a time interval preceding a system clock nth increment, index "n" being integer 1, each member of an initial group of the RTDs receiving, over a respective initial reception path from the CRD to the member of the initial group of the RTDs, a CRD broadcast of a route request (RQS), the RQS comprising an identifier (DST-ID) of the DST device and, in response, each member of the initial group of the RTDs estimating, as respective estimated a quality (EQI) of its respective initial reception path from the CRD, between a good hop and a bad hop and instantiating a routing record, indicating the member of the initial group of the RTDs being an end node of a respective hop path from the CRD, in a respective in-progress hop connection from the CRD to the DST device;

b) at the system clock nth increment each member of the initial group of the RTDs sending, as a respective nth increment rebroadcasting (RBS) sender, a respective nth increment RBS of the RQS, each respective nth increment RBS of the RQS configured for reception by a respective (n+1)th increment group of the RTDs, each member of the respective (n+1)th increment group of the RTDs receiving the respective nth increment RBS over a respective (n+1)th increment reception path; and c) during a time interval extending from the system clock nth increment to the system clock (n+1)th increment, members of the (n+1)nth group of the RTDs in response to it receiving, over its respective (n+1)th increment reception path paths, one or more of the nth increment RBSs and, in response, each member of the nth group estimating a quality (EQI) of its respective (n−1)th increment reception path, between a good hop and a bad hop and instantiating a routing record, indicating now being a current end node of a hop sequence from the CRD to the DST device and having a total path quality (TPQ), which is based at least in part on the one hop from the CRD and on the EQI of its respective (n−1)th increment reception path.

7. A computer-based method for automatic best path selecting, by a subject router device (RTD) which is one RTD in a mesh of RTDs, among a plurality of in-progress hop links from a coordinator device (CRD) through the mesh of RTDs toward a destination (DST) device, and incrementing the selected in-progress hop link by appending the subject RTD as a next node to the selected in-progress link, the subject RTD including a programmable computer comprising a processor communicatively connected to a receiver, a transmitter, and an information storage, the information storage including a non-transitory storage device that stores processor executable instructions, and the method comprising computer steps by the processor caused by executing the processor executable instructions, the computer steps comprising:

receiving by the receiver over a time window starting at an initial time and expiring at an expiry time that is a window duration after the initial time, of N rebroadcastings (RBSs) of a route request (RQS), N being an integer more than 1, wherein:

the receiving of each of the N RBSs of the RQS being from a respective RBS sender RTD that is among N RBS sender RTDs, each of the N RBS sender RTDs being in the mesh of RTDs and positioned as an immediate neighbor of the subject RTD, the receiving of each of the N RBSs is over a respective reception path from the respective RBS sender RTD to the subject RTD and includes a respective RBS sender RTD identifier (ID) identifying the RBS sender RTD, and a respective total path quality (TPQ) value, which comprises a respective accumulated total number of hops and a respective accumulated total number of bad hops in a respective hop path from the CRD to the respective RBS sender RTD, and in response to each of the N RBSs of the RQS, i) generating a respective estimated path quality, between good hop and bad hop of the respective reception path, ii) generating a respective incremented accumulated TPQ value, based on a summing of the respective accumulated TPQ value and the respective estimated path quality, wherein performing steps (i) and (ii) for the N RBSs generates a total of N respective accumulated TPQ values, the N respective accumulated TPQ values include a best accumulated TPQ value, and one or more of the RBSs of the RQS has a step (ii) respective accumulated TPQ value equal to the best accumulated TPQ value; and updating a route table information in the information storage, the updating being arranged such that, at expiry of the time window, a route record is stored in the information storage, the route record indicating the subject RTD being a current node of an in-progress sequential hop path from the CRD toward the DST device, and indicating, as a preceding node of the in-progress sequential hop path from the CRD toward the DST device, the respective RBS sender RTD of one of the one or more of the RBSs of the RQS having a step (ii) respective accumulated TPQ value equal to the best accumulated TPQ value.

* * * * *